United States Patent
Gunderson et al.

(10) Patent No.: US 9,830,932 B1
(45) Date of Patent: Nov. 28, 2017

(54) ACTIVE SHOOTER AND ENVIRONMENT DETECTION

(71) Applicant: The United States of America, as represented by the Secretary of the Air Force, Washington, DC (US)

(72) Inventors: Daniel Gunderson, Hermosa Beach, CA (US); Andrew Hyde, Warner Robins, GA (US); Evan Glowiak, Lancaster, CA (US); Bruce VonNiederhausern, Bonaire, GA (US); Carlos Horner, Bonaire, GA (US); Christopher Perrine, Montgomery, AL (US); Steve Boswell, Warner Robins, GA (US)

(73) Assignee: The United States of America as represented by the Secretery of the Air Force, Washington, DC (US)

( * ) Notice: Subject to any disclaimer, the term of this patent is extended or adjusted under 35 U.S.C. 154(b) by 0 days.

(21) Appl. No.: 15/599,999

(22) Filed: May 19, 2017

Related U.S. Application Data

(60) Provisional application No. 62/341,678, filed on May 26, 2016.

(51) Int. Cl.
| | |
|---|---|
| *G10L 25/51* | (2013.01) |
| *G08B 21/18* | (2006.01) |
| *G08B 25/10* | (2006.01) |
| *H04R 1/40* | (2006.01) |
| *H04R 1/28* | (2006.01) |

(Continued)

(52) U.S. Cl.
CPC ............ *G10L 25/51* (2013.01); *G08B 21/182* (2013.01); *G08B 25/10* (2013.01); *G10L 25/30* (2013.01); *H04R 1/2869* (2013.01); *H04R 1/406* (2013.01); *H04R 3/005* (2013.01)

(58) Field of Classification Search
None
See application file for complete search history.

(56) References Cited

U.S. PATENT DOCUMENTS

| | | |
|---|---|---|
| 6,121,885 A | 9/2000 | Masone et al. |
| 7,277,018 B2 | 10/2007 | Reyes et al. |

(Continued)

OTHER PUBLICATIONS

Honeywell Glassbreak Detectors Overview, 2006, www.honeywell.com/security/uk/intruder.

*Primary Examiner* — Paul Huber
(74) *Attorney, Agent, or Firm* — AFMCLO/JAZ; Timothy Barlaw

(57) ABSTRACT

A sensor device to detect an audio wave and determine whether the audio wave is a gunshot is provided. The sensor device may include microphone, analog-to-digital converter (ADC), microcontroller, and switch. The ADC may convert audio waves received from microphone into a digital signal. The microcontroller connected to the ADC may compare the digital signal of the audio waves with predetermined audio wave to determine whether the audio waves meet audio threshold parameters. The switch operatively connected to the microcontroller may transmit a trip signal to a predetermined emergency management and response system upon the microcontroller determining that the audio waves meet the audio threshold parameters. A gunshot detection system including the sensor device and a method of detecting a gunshot are also provided.

15 Claims, 13 Drawing Sheets

(51) Int. Cl.
*H04R 3/00* (2006.01)
*G10L 25/30* (2013.01)

(56) References Cited

U.S. PATENT DOCUMENTS

| | | |
|---|---|---|
| 7,460,020 B2 | 12/2008 | Reyes et al. |
| 7,961,550 B2 | 6/2011 | Calhoun |
| 2008/0048851 A1 | 2/2008 | Reyes et al. |
| 2011/0170798 A1 | 7/2011 | Tidhar |
| 2012/0300587 A1 | 11/2012 | Azimi-Sadjadi et al. |
| 2015/0204109 A1 | 7/2015 | Ergenbright |
| 2016/0232774 A1* | 8/2016 | Noland ............... G08B 13/1672 |
| 2017/0116980 A1* | 4/2017 | Zhang ..................... G10L 15/30 |
| 2017/0248388 A1* | 8/2017 | Young ..................... F41C 27/00 |

* cited by examiner

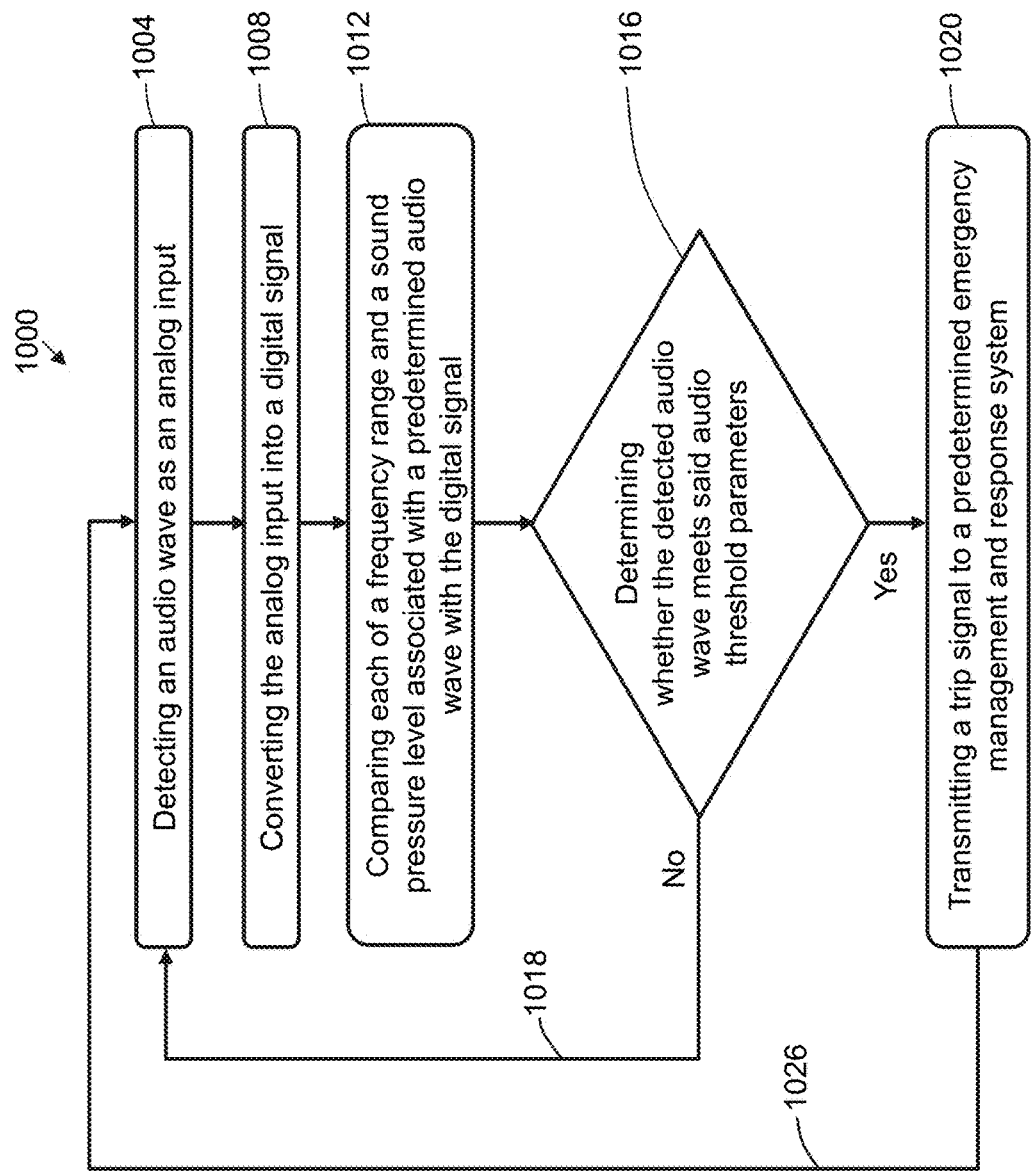

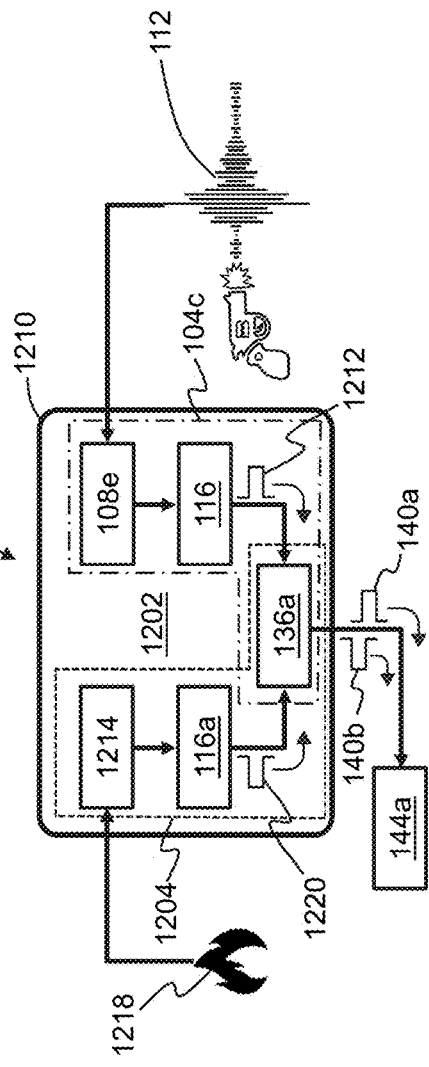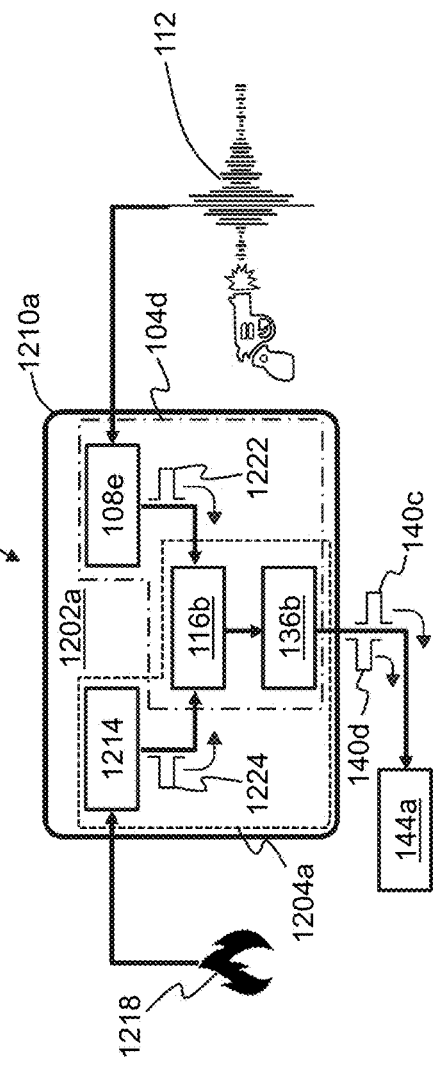

ACTIVE SHOOTER AND ENVIRONMENT DETECTION

CROSS REFERENCE TO RELATED APPLICATION(S)

This application claims the benefit of U.S. Provisional Patent Application No. 62/341,678 filed on May 26, 2016, the contents of which, in its entirety, is herein incorporated by reference.

GOVERNMENT INTEREST

The invention described herein may be manufactured and used by or for the Government of the United States for all government purposes without the payment of any royalty.

BACKGROUND

Field of the Invention

The embodiments herein generally relate to an active shooter protection system and method of using the same, and more particularly to a system that may detect a gunshot and alert a management and response system to provide near instantaneous gunshot location identification.

Background of the Invention

An active shooter generally refers to an individual engaged in killing or attempting to kill people through the use of firearms, but may also include other types of weapons. Recently, active shooter incidents in occupied facilities such as campuses, military bases, and commercial establishments, have involved single shooters more often than multiple shooters. Such active shooter incidents have typically ended in under 5 minutes more often than extending for a longer period of time, and have ended before police arrive more frequently than ending after police arrive. Also, such active shooter incidents have frequently occurred indoors, but have also been outdoors, and were often confined to one building. Conventional control measures for active shooter incidents may be considered insufficient to reduce and prevent active shooter incidents or to improve law enforcement response time to such events. First responders, typically dispatched via standard 911 or emergency notifications, may not be able to respond to an active shooter incident quickly enough to prevent injuries or deaths.

The above information disclosed in this Background section is only for enhancement of understanding of the background of the disclosure and therefore it may contain information that does not form any part of the prior art nor what the prior art may suggest to a person of ordinary skill in the art.

BRIEF SUMMARY OF THE INVENTION

In view of the foregoing, an embodiment herein provides a sensor device to detect an audio wave and determine whether the audio wave is a gunshot. The sensor device includes at least one microphone, at least one analog-to-digital converter (ADC), a microcontroller, and a switch. The at least one microphone is configured to receive audio waves. The at least one ADC is operatively connected to the at least one microphone and configured to convert the audio waves into a digital signal. The microcontroller is operatively connected to the at least one ADC and includes a non-transitory computer-readable memory having instructions stored thereon, the instructions comprising audio threshold parameters related to each of a frequency range and a sound pressure level associated with a predetermined audio wave. The microcontroller is configured to compare the digital signal of the audio waves with the predetermined audio wave to determine whether the audio waves meet the audio threshold parameters. The switch is operatively connected to the microcontroller and configured to transmit a trip signal to a predetermined emergency management and response system upon the microcontroller determining that the audio waves meet the audio threshold parameters.

Embodiments of the sensor device may further include any of a radio frequency (RF) module configured to wirelessly transmit the trip signal, a network port, an Ethernet port, a wave guide port, and a hard wire port operatively connected to the switch. The predetermined emergency management and response system may include any of a fire protection system and a security system.

Embodiments of the sensor device may further include a dampener surrounding the at least one microphone. The at least one microphone may include a plurality of microphones, and the dampener may include a plurality of dampeners that are configured to dampen the plurality of microphones at different levels from each other. The at least one microphone may include a plurality of microphones each independently configured to receive the audio waves for input into the at least one ADC, and the at least one ADC may create a separate digital signal for audio waves received by each microphone. The microcontroller may be configured to compare the separate digital signal for the audio waves received by each microphone with the predetermined audio wave to determine whether the audio waves received by each microphone independently meet the audio threshold parameters. The switch may be configured to transmit the trip signal upon the microcontroller determining that the audio waves received by a predetermined number of the plurality of microphones meet the audio threshold parameters. The predetermined audio wave may be associated with an audio wave generated by a gunshot.

Another embodiment provides a method of detecting a gunshot. The method includes detecting, via at least one microphone, an audio wave as an analog input. The method includes converting, via at least one ADC operatively connected to the at least one microphone, the analog input into a digital signal. The method includes comparing, via a microcontroller operatively connected to the at least one ADC and programmed with audio threshold parameters related to each of a frequency range and a sound pressure level associated with a predetermined audio wave, the digital signal with the predetermined audio wave. The method includes determining, via the microcontroller, whether the detected audio wave meets the audio threshold parameters. The method includes transmitting, via a switch operatively connected to the microcontroller, a trip signal to a predetermined emergency management and response system upon the microcontroller determining that the detected audio wave meets the audio threshold parameters.

In embodiments of the method the comparing may include inputting the digital signal to a neural network. The neural network may include at least one input layer of at least sixty-two input nodes, at least one hidden layer of at least fifteen nodes, and at least one output layer of at least two output nodes. The neural network may include a trained neural network comprising learned gunshots and learned false alarms received by the at least one microphone to provide classification between detected gunshots and detected false alarms. The transmitting the trip signal in the method may include any of wirelessly transmitting, transmitting over an Ethernet, transmitting over a wave guide, and transmitting over a wire.

In embodiments of the method the predetermined emergency management and response system may include any of a fire protection system and a security system. The method may further include dampening the audio wave via a dampener surrounding the at least one microphone. The at least one microphone may include a plurality of microphones, and the detecting may include detecting the audio wave as a plurality of analog inputs via the plurality of microphones. The converting may include converting each analog input into a separate digital signal. The comparing may include comparing each separate digital signal with the predetermined audio wave. The determining may include determining whether each of the plurality of analog inputs independently meets the audio threshold parameters.

Embodiments of the method may further include dampening the plurality of microphones at different levels from each other, wherein the transmitting may include transmitting the trip signal upon determining, via the microcontroller, that the audio wave detected by the plurality of microphones meets the audio threshold parameters. The predetermined audio wave may be associated with an audio wave generated by a gunshot.

Another embodiment provides a gunshot detection system. The gunshot detection system includes at least one audio wave detector. The audio wave detector includes an audio sensor configured to receive an audio wave, a processor configured to compare the received audio wave with a stored predetermined audio wave, and a switch configured to transmit a trip signal when the received audio wave comprises parameters that fall within a range of parameters of the stored predetermined audio wave, wherein the switch refrains from transmitting the received audio wave.

In embodiments of the gunshot detection system the range of parameters of the stored predetermined audio wave may include a frequency range and a sound pressure level. The at least one audio wave detector may further include any of a RF module, a network port, an Ethernet port, a wave guide port, and a hard wire port operatively connected to the switch, wherein the RF module is configured to wirelessly transmit the trip signal.

Embodiments of the gunshot detection system may further include at least one environment detector. The environment detector may include an environment sensor configured to receive an environment indicator, and an environment processor configured to compare the received environment indicator with a stored predetermined environment indicator threshold. The switch may be configured to transmit an environment trip signal when the received environment indicator matches the stored predetermined environment indicator threshold.

Another embodiment provides a gunshot and environment detection system. The gunshot and environment detection system includes at least one audio wave detector, at least one environment detector, and a switch. The at least one audio wave detector includes an audio sensor configured to receive an audio wave, and a processor configured to compare, using a neural network, the received audio wave with a stored predetermined audio wave. The at least one environment detector includes an environment sensor configured to receive an environment indicator, and an environment processor configured to compare the received environment indicator with a stored predetermined environment indicator threshold. The switch is configured to transmit a trip signal when the received audio wave comprises parameters that fall within a range of parameters of the stored predetermined audio wave, wherein the switch refrains from transmitting the received audio wave, and wherein the switch is configured to transmit an environment trip signal when the received environment indicator matches the stored predetermined environment indicator threshold.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 11 is a flow diagram of a method for determining whether received audio waves fall within the range of audio threshold parameters of a gunshot according to an embodiment herein;

FIG. 12A is a schematic of a combination gunshot and environment detection system and an emergency management and response system according to an embodiment herein;

FIG. 12B is a schematic of a combination gunshot and environment detection system and an emergency management and response system according to another embodiment herein.

DETAILED DESCRIPTION OF THE INVENTION

Figure 1:
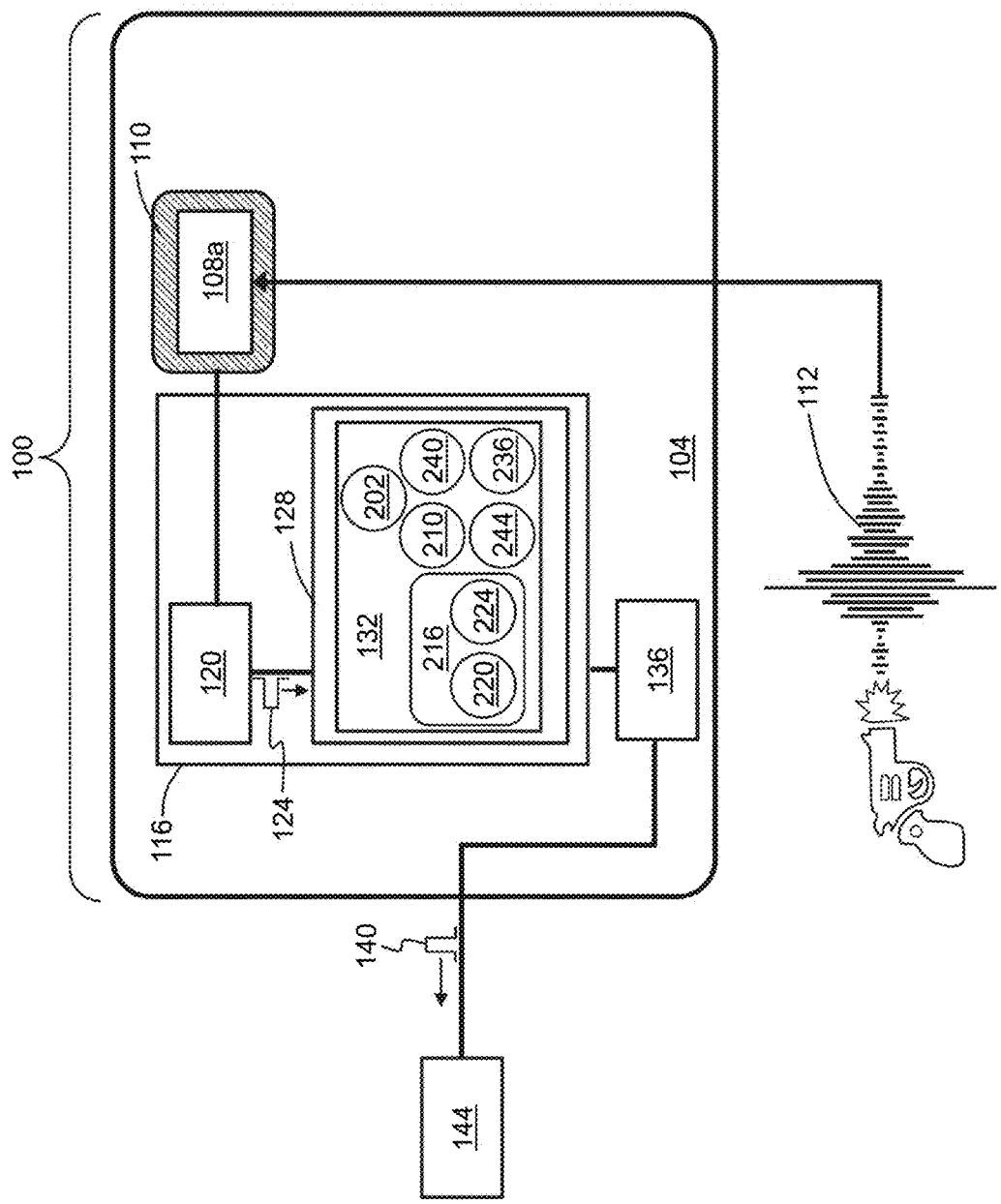
FIG. 1 is a schematic of a gunshot detection system and an emergency management and response system according to an embodiment herein.

Embodiments of the disclosed invention, its various features and the advantageous details thereof, are explained more fully with reference to the non-limiting embodiments that are illustrated in the accompanying drawings and detailed in the following description. Descriptions of well-known components and processing techniques are omitted to not unnecessarily obscure what is being disclosed. Examples may be provided and when so provided are intended merely to facilitate an understanding of the ways in which the invention may be practiced and to further enable those of skill in the art to practice its various embodiments. Accordingly, examples should not be construed as limiting the scope of what is disclosed and otherwise claimed.

It will be understood that when an element or layer is referred to as being "on", "connected to", or "coupled to" another element or layer, it may be directly on, directly connected to, or directly coupled to the other element or layer, or intervening elements or layers may be present. In contrast, when an element or layer is referred to as being "directly on", "directly connected to", or "directly coupled to" another element or layer, there are no intervening elements or layers present. It will be understood that for the purposes of this disclosure, "at least one of X, Y, and Z" may be construed as X only, Y only, Z only, or any combination of two or more items X, Y, and Z (e.g., XYZ, XYY, YZ, ZZ).

In the drawings, the size and relative sizes of layers and regions may be exaggerated for clarity.

Referring now to the drawings, and more particularly to FIGS. 1 through 12C, where similar reference characters denote corresponding features consistently throughout, there are shown exemplary embodiments of systems and methods for a rapid alert of a gunshot location to an emergency management and response system, and providing real-time updates to the emergency management and response system of the gunshots of an active shooter.

FIG. 1 is a schematic of a gunshot detection system 100 and an emergency management and response system 144 for detecting a gunshot of an active shooter according to an embodiment herein. In the embodiment, the detection system 100 may operate automatically, that is, for example, without manual operator monitoring, interpretation, input, decision making, or judgment. As illustrated in FIG. 1, the gunshot detection system 100 may include a sensor device, referred to herein as an audio wave detector 104. The audio wave detector 104 may include an audio sensor, such as a microphone 108a, configured to receive audio waves 112, such as from a gunshot. An example microphone is an ELECTRET MICROPHONE AMPLIFIER (MAX9814 with auto gain control from ADAFRUIT INDUSTRIES™). The microphone 108a may have a microphone dampener 110 to lower incident sound pressure levels to an operable range of the microphone 108a. The dampener 110 may surround the microphone 108a and may be configured as a mat material such as DYNAMAT™ or DYNAPAD™ material (from Dynamic Control of North America, Inc.). However, the dampener 110 may not be required in all embodiments, and in some embodiments, the microphone 108a may be non-dampened.

The audio wave detector 104 may include a processor 116 to compare the received audio wave 112 to stored predetermined audio threshold parameters 210. An example processor is TEENSY 3.1 microcontroller (from ADAFRUIT INDUSTRIES™). The stored predetermined audio threshold parameters 210 may include parameters of a gunshot audio wave, such as frequency range and sound pressure level, as described in more detail below.

The processor 116 may include an analog-to-digital converter (ADC) 120 operatively connected to the microphone 108a and the ADC 120 may convert the audio wave 112 into a digital signal 124 (also referred to as a digital signal of audio wave). The processor 116 may also include a microcontroller 128 operatively connected to the ADC 120. The microcontroller 128 may have stored, on a non-transitory computer-readable memory 132, instructions 202 to compare the digital signal 124 of the audio wave 112 to the predetermined audio threshold parameters 210.

Figure 2:
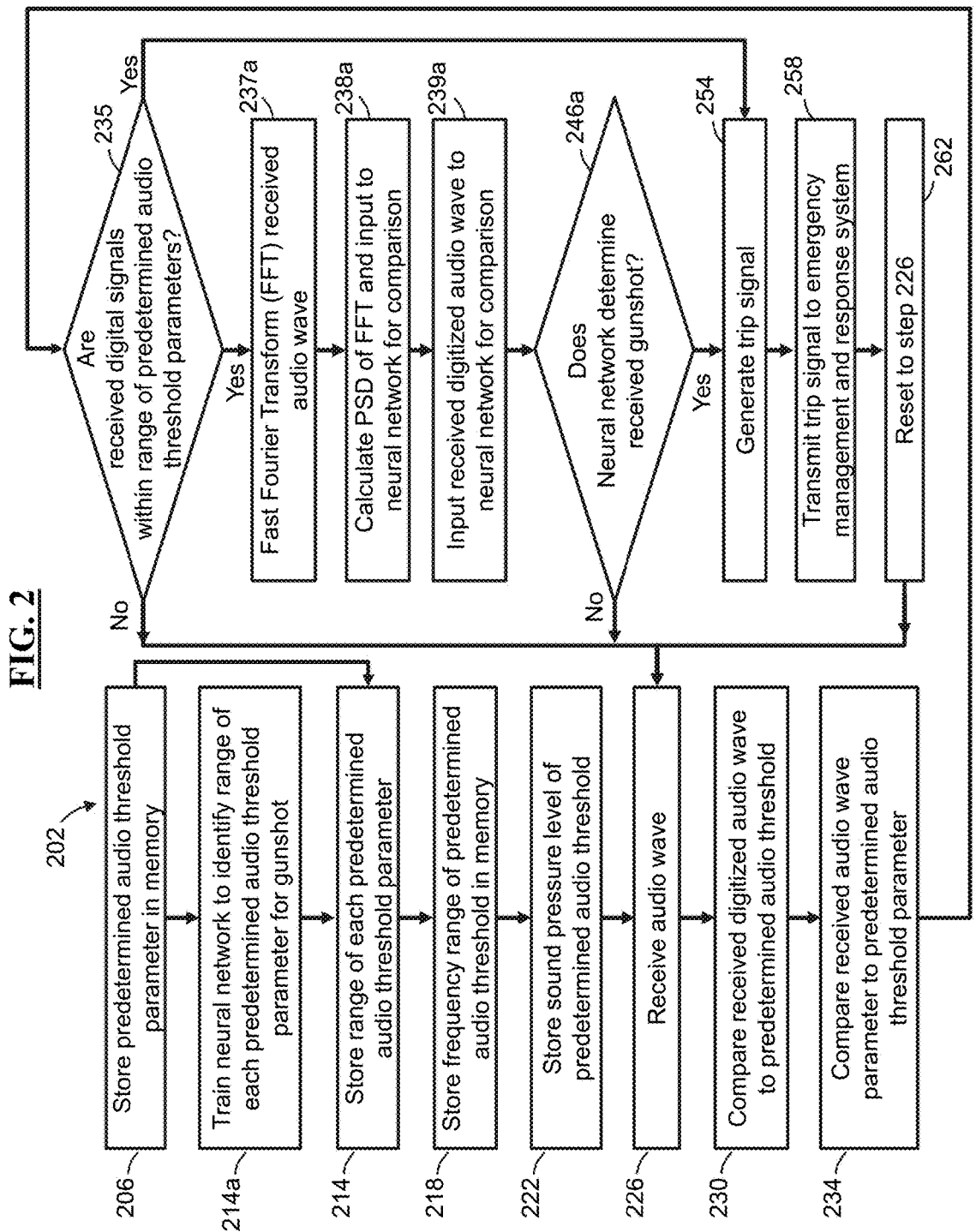
FIG. 2 is a flow diagram of instructions stored on a non-transitory computer-readable memory for determining whether received audio waves fall within the range of audio threshold parameters of a gunshot and using a neural network for determining whether received audio waves fall within the range of audio threshold parameters of a gunshot according to an embodiment herein.

FIG. 2, with reference to FIG. 1, illustrates a process 202 for preparing or setting up the gunshot detection system 100 for operation and for comparing the received audio wave 112 to the stored predetermined audio threshold parameters 210. The predetermined audio threshold parameters 210 may be stored in the non-transitory computer-readable memory 132 at step 206. As used herein, reference to parameters, levels, ranges, thresholds, variables, and the like, refers to a data component stored in the computer readable memory 132. The stored predetermined audio threshold parameters 210 may be stored as at least one audio threshold parameter 216 in step 214, for example, a frequency range 220 of the predetermined audio threshold parameters 210 may be stored in step 218, and a sound pressure level 224, referred to herein as decibel (dB) level, of the predetermined audio threshold parameters 210 may be stored in step 222. The predetermined frequency range 220 and the predetermined sound pressure level 224 are described in greater detail below.

In the process 202 for comparing the received audio wave 112 to the stored predetermined audio threshold parameters 210, the instructions stored on the non-transitory computer-readable memory 132 may include the microcontroller 128 receiving the digital signal 124 at step 226, and comparing the received digital signal 124 to the predetermined audio threshold parameters 210 at step 230. For example, as indicated by step 234, the microcontroller 128 may compare a received audio wave parameter 236 to a parameter of the stored predetermined audio threshold parameters 216. This may include comparing a frequency range 240 of the received audio wave 112 digital signal 124 to the stored frequency range 220, and comparing the sound pressure level range 244 of the received audio wave 112 to the sound pressure level range 224 of the predetermined audio threshold parameters 210.

Based on the comparisons, the microcontroller 128 may determine whether the digital signal 124 falls within the range of the audio threshold parameters 216 in step 235. When the digital signal 124 falls within the range of the audio threshold parameters 216, also referred to herein as meeting the audio threshold parameters 216, in step 235 the microcontroller 128 determines that the audio waves 112 comprises audio waves of a fired gunshot sound, referred to herein as a gunshot report. Upon determining that the audio waves 112 comprise audio waves of a gunshot report, the microcontroller 128 may control a switch 136 operatively connected to the microcontroller 128 to transmit a trip signal 140 to the emergency management and response system 144 at steps 254 and 258, respectively. In certain embodiments, the switch 136 may refrain from transmitting the received audio wave 112 and refrain from sending the digital signal 124. In other words, audio picked up by the microphone 108a may not be transmitted by switch 136, instead, the switch 136 may only transmit the trip signal 140. For example, the trip signal 140 may be a discrete signal (voltage drop/opening circuit) with no other information in the signal such that the trip signal 140 notes an alarm condition and transmits the alarm condition to the emergency management and response system 144. In an embodiment, the switch 136 provides a physical separation between the digital signal 124 received by the microcontroller 128 and the transmission of the trip signal 140 in the form of a relay to prevent eavesdropping on audio from the microphone 108a. An example switch is an SPST relay (934-HE3621A0500) from MOUSER™.

In the process 202 for preparing or setting up the gunshot detection system 100 for operation and for comparing the received audio wave 112 to the stored predetermined audio threshold parameters 210, a neural network stored in the non-transitory computer-readable memory 132 may be used. In the process 202 of using the neural network, the neural network may be trained at step 214a. The neural network may be configured as a feed forward artificial network (FFAN). The training of the neural network may include inputting audio parameters of gunshots as positives as well as sounds that may be detected as false alarms as negatives. The inputs may be gunshots from a broad range of guns recorded through the microphone 108a and spaced apart from the microphone 108a at various predetermined ranges relevant to an in-service location of the audio wave detector 104. For example, the microcontroller 128 may perform a Fast Fourier Transform (FFT) calculation on the digitized signal 124 of the received audio wave 112 of a known gunshot. The Power Spectral Density (PSD) magnitudes may be calculated from the FFT calculation and input to the neural network. As described below, the PSD magnitudes indicate where the average power of the digital signal 124 is distributed as a function of frequency. The PSD may be divided into frequency bins within a predetermined frequency range to use as inputs to the neural network in comparison when determining whether a sound detected is a gunshot according to an embodiment herein.

Once the neural network has been trained through gathering gunshot data in the learning stage, the gunshot detection system 100 may be put into operation to detect an active shooter. In certain embodiments, updates to the trained neural network may be uploaded to the non-transitory computer-readable memory 132 (e.g., through firmware updates, etc.) that may increase a gunshot detection probability by enhancing the gunshot detection and analysis of the gunshot detection system 100.

In the process 202, the neural network is used for comparing the received audio wave 112 to the stored predetermined audio threshold 210. Programmable instructions are stored on the non-transitory computer-readable memory 132. The microcontroller 128 receives the digital signal 124 at step 226, and the received digital signal 124 is presented to the neural network at step 239a. For example, as indicated by step 237a, the microcontroller 128 may perform a FFT calculation on the digitized signal 124 of the received audio wave 112. The PSD magnitudes may be calculated from the FFT calculation and presented to the neural network at step 238a. The PSD may be divided into frequency bins within the predetermined frequency range that may be used as inputs to the neural network to determine when a gunshot is fired according to an embodiment herein.

Based on the neural network classification result, the microcontroller 128 may determine whether the digital signal 124 is declared as a gunshot in step 246a. When the digital signal 124 is declared a gunshot by the neural network in step 246a the microcontroller 128 determines that the audio waves 112 comprise audio waves of a fired gunshot report. Upon determining that the audio waves 112 comprise audio waves of a gunshot report, the microcontroller 128 may control the switch 136 operatively connected to the microcontroller 128 to transmit the trip signal 140 to the emergency management and response system 144 at steps 254 and 258, respectively. In these embodiments, the switch 136 may be configured to only transmit the trip signal 140 and not the received audio wave 112 or digital signal 124 to avoid eavesdropping concerns that may violate privacy. That is, audio picked up by the microphone 108a may not be transmitted by switch 136, instead, only the trip signal 140 may be transmitted as described above.

After transmitting the trip signal 140, the process 202 returns to receiving digital signals 124 at step 262, which resets the process 202 back to step 226. The process steps from 226 through 262 may occur nearly instantaneously in real time while the microphones 108a may continuously receive audio wave 112 during the process steps of 226 through 262. In certain embodiments, the microcontroller 128 non-transitory computer-readable memory 132 may include a sound wave information buffer (not shown) to store received audio wave 112 or digital signal 124 in process step 226. When the digital signal 124 does not fall within the range or meet the audio threshold parameters 216 in steps 235, 246a the microcontroller 128 may determine that the audio waves 112 are not a gunshot report and the process 202 may return to receiving digital signals 124 at step 226.

In an embodiment, the switch 136 may be configured as a relay or other initiating device, for example, the switch 136 may be an electromechanical relay, solid state relay, and the like, compatible with the circuit it is connected to, for example the emergency management and response system 144. The trip signal 140 may have information including the location of the audio wave detector 104 and positive identification of a gunshot and transmit the information to the emergency management and response system 144. The location information of the audio wave detector 104 may include the geospatial address, building, floor level, room number, or floor zone, and the like.

Figure 3:
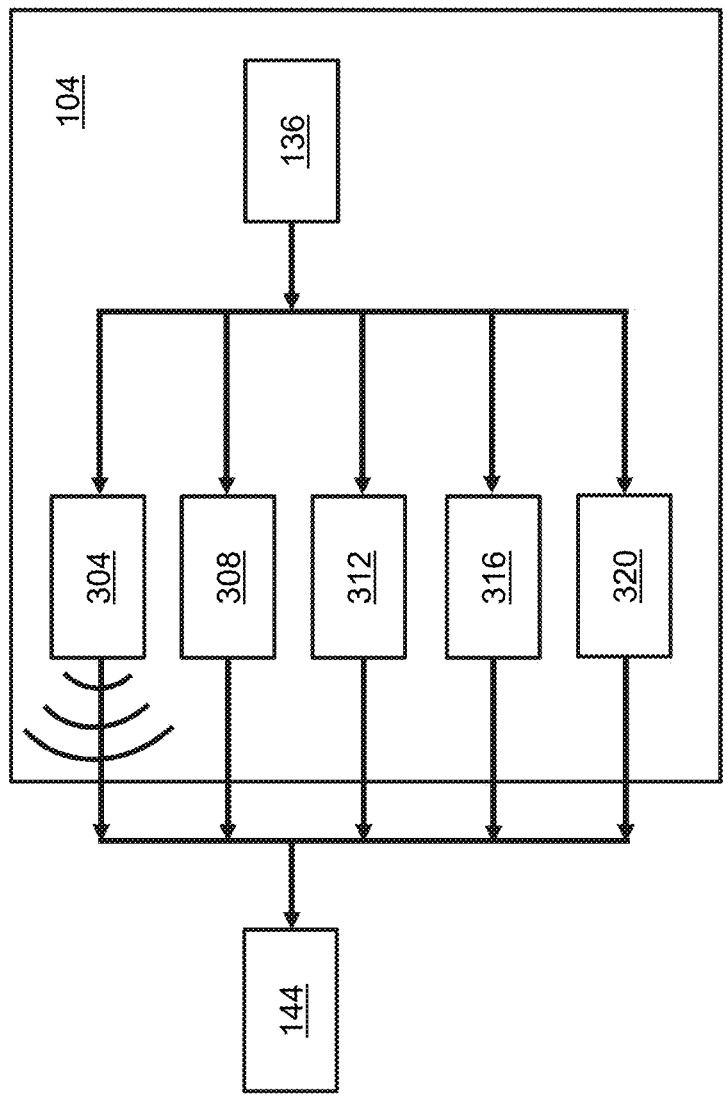
FIG. 3 is a schematic diagram illustrating a switch in an audio wave detector operatively connected to any of a radio frequency (RF) module, a network port, an Ethernet port, signal line circuit, a wave guide, such as optical fiber, port, and a hard wire port according to an embodiment herein.

FIG. 3, with reference to FIGS. 1 and 2, is a schematic diagram illustrating the switch 136 in the audio wave detector 104, which may be operatively connected to any of a radio frequency (RF) module 304, a network port 308, an Ethernet port 312, a wave guide, such as optical fiber port 316, and a hard wire port 320, such as a signal line circuit or standard loop circuit that may be National Fire Protection Association (NFPA) standard compliant according to an embodiment herein. Accordingly, the trip signal 140, also referred to herein as a gunshot identification signal, may be transmitted via a multitude of communication protocols, including Ethernet, to the emergency management and response system 144. In an example, an XBEE adapter board (TEENSY to XBEE Adapter, Part Number KIT-XBEE Adapter from PJRC™) and a XBEE transmitter (XBEE PRO, Part Number XBP24BZ7WIT-004 from DIGIKEY™) may be used to wirelessly transmit trip signal 140.

Figure 4:
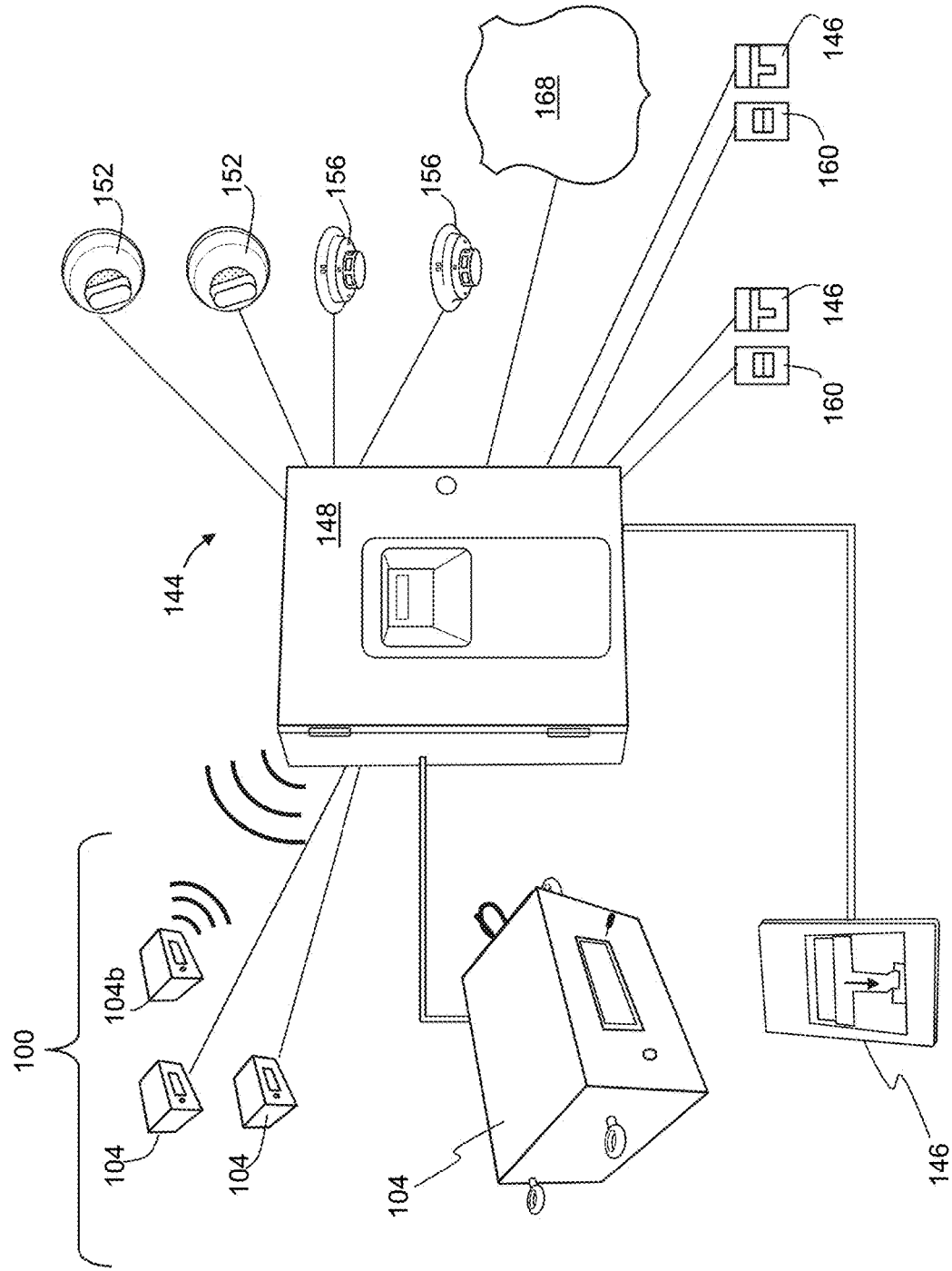
FIG. 4 is a schematic of a gunshot detection system and an emergency management and response system according to an embodiment herein.

As illustrated in FIG. 4, with reference to FIGS. 1 through 3, the gunshot detection system 100 may include a plurality of audio wave detectors 104 and 104b, where audio wave detector 104b is illustrated as communicating wirelessly with the emergency management and response system 144. Optionally, the gunshot detection system 100 may include at least one pull box 146 for manual input of a shooter alert to the emergency management and response system 144. In this regard, the manual alert pull boxes 146 may optionally be included in the gunshot detection system 100 to provide capability for facility occupants to initiate the alarm, for example, when a threat is present but a firearm has not been discharged.

The emergency management and response system 144 may include a control panel 148 such as a Fire Alarm Control Panel (FACP), fire protection infrastructure, and graphical user interfaces compatible with FACPs. The fire protection infrastructure may include a local alarm system 152 that may include a visual and/or auditory alarm, a fire detection system 156 such as heat and smoke detectors, pull box systems 160 such as for fire, medical, chemical, or police emergencies that may be activated manually by users. The local alarm system 152 may activate a different visual and/or auditory alarm when the trip signal 140 is received by the control panel 148 indicating an active shooter compared to a fire or other visual and/or auditory alarm response.

The switch 136 may transmit the trip signal 140 to the FACP per National Fire Protection Association (NFPA) standards. The gunshot detection system 100 may be powered by the FACP power wiring, and communicate through FACP signal line wires, eliminating the need for any stand-alone power source or signal wiring. Existing fire protection systems as emergency management and response systems 144, when combined with gunshot detection system 100, may immediately notify authorities 168 of a triggered detector's (e.g., audio wave detectors 104, 104b) location, and immediately alert building occupants via the active shooter visual and/or auditory alarm, when detecting a gunshot. Such an alert may be distinct from other alerts that may indicate a fire or other emergency. While not limited to such an application, the gunshot detector system 100 may be utilized in any building where fire and/or security emergency management and response systems 144 are found. In an alternate embodiment, the gunshot detector system 100 may be utilized in any building on a system dedicated to the gunshot detector system 100, that is, without a fire and/or security emergency management and response system 144.

Figure 5:
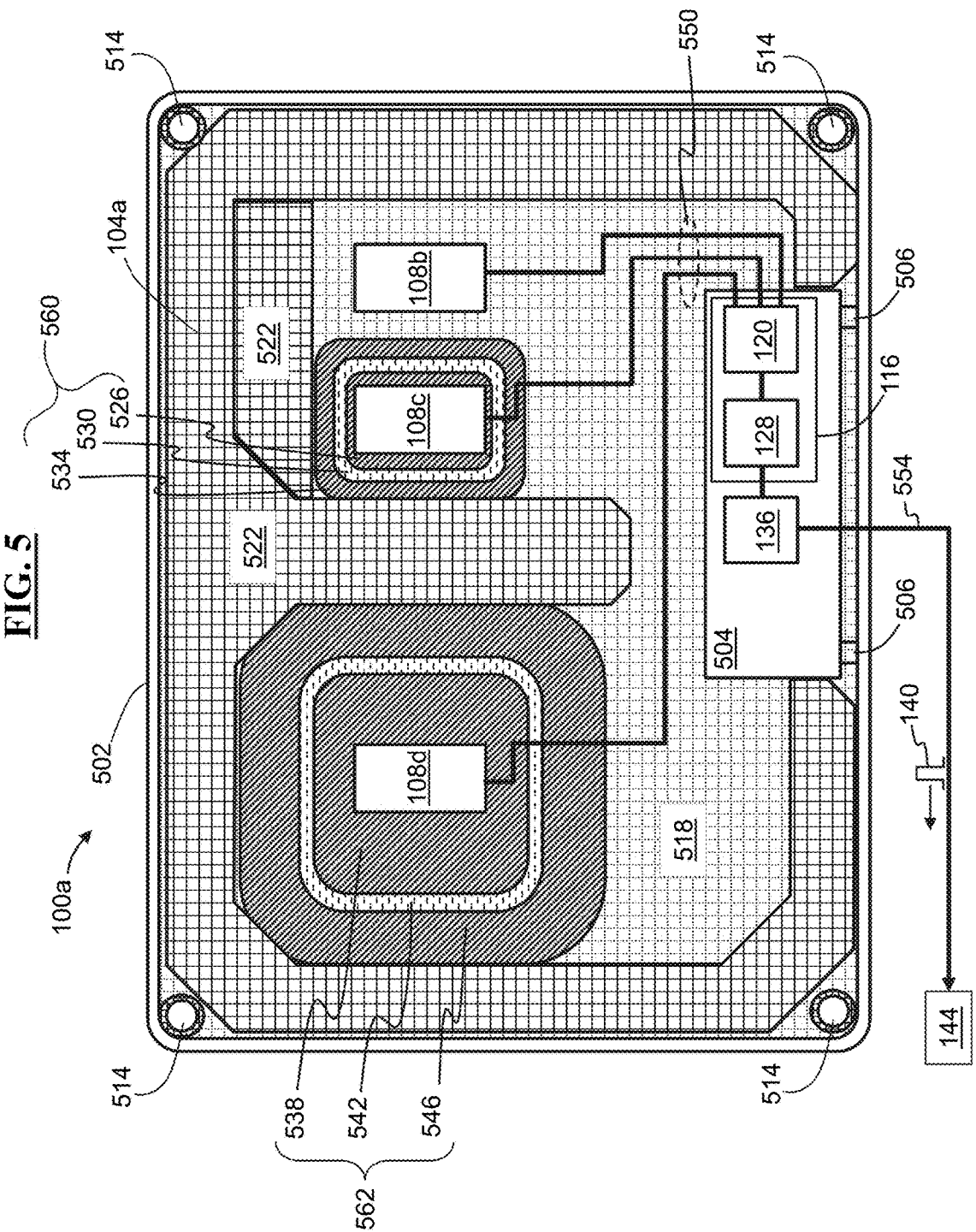
FIG. 5 is a schematic of a gunshot detection system showing a plurality of microphones damped at different levels including no dampening according to an embodiment herein.

FIG. 5, with reference to FIGS. 1 through 4, is a schematic of a gunshot detection system 100a showing a plurality of microphones 108b-108d in a sensor device (audio wave detector) 104a damped at different levels including no dampening on first microphone 108b according to an embodiment herein. A housing 502 may be mountable to a ceiling or a wall in a building room or passageway and contain the sensor device 104a. A circuit board 504 connected in the housing 502 by bosses 506 may support the processor 116 and switch 136. Fastener holes 514 may accept fasteners to close a lid (not shown) on the housing 502. Padding 518 may be disposed on the bottom of the housing 502 to secure all internal components of the sensor device 104a. In one embodiment, the first microphone 108b may have no dampening in order to pick up more distant and gunshot reports having relatively lower sound pressure levels. However, such an undampened microphone may not be able to distinguish a loud noise such as a file cabinet drawer slamming, from a gunshot report. A second microphone 108c may have an intermediate level of surrounding dampening 560 comprising, for example, three layers 526, 530, and 534, to pick up intermediate distant and gunshot reports having relatively medium sound pressure levels at the sensor device 104a. A third microphone 108d in the sensor device 104a may have a high level of surrounding dampening 562 greater than the intermediate level of dampening 560, comprising, for example, three layers 538, 542, and 546, to pick up close proximity and gunshot reports having relatively high sound pressure levels. Packing material 522 may be disposed between components of the sensor device 104a to minimize movement and erroneous sounds from the components.

The microphones 108b-108d may be operatively connected to the ADC 120 by connectors 550, such as wires, and the ADC 120 may convert the audio wave 112 into a digital signal 124. The microcontroller 128 comprises the non-transitory computer-readable memory 132 (shown in FIG. 1), which contains the instructions to compare the received audio wave 112 to the stored predetermined audio threshold parameters 210. Switch 136 may transmit trip signal 140 over connector 554 to emergency management and response system 144 when the received audio wave 112 is determined to be a gunshot report as described above.

Figure 6:
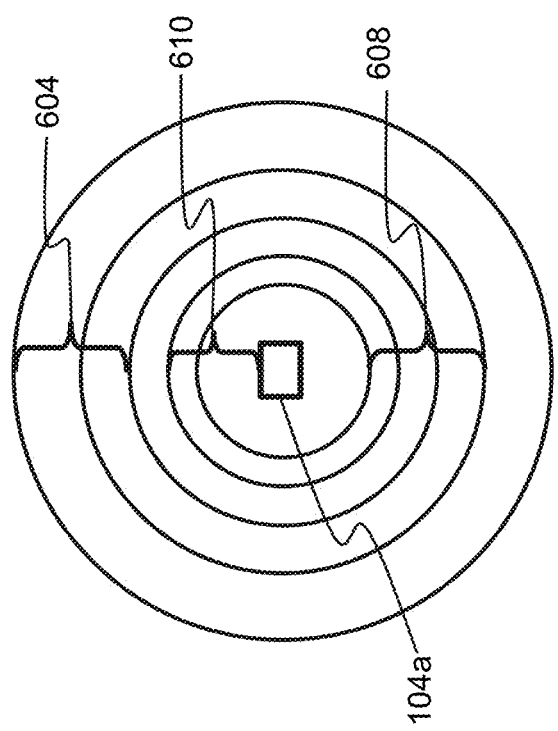
FIG. 6 is a schematic diagram of effective range of microphones having increasing levels of dampening associated with probability of detection, and environment of the sensor that may create multiple concentric overlapping circles or rings of detection originating at the gunshot detection device according to an embodiment herein.

FIG. 6, with reference to FIGS. 1 through 5, illustrates the varying levels of dampening and the number of microphones that may be associated with an effective range, level of cost, probability of detection, and environment of the sensor. Multiple microphones 108b-d may create multiple concentric overlapping circles or rings 604, 608, 610 of detection originating at the sensor device (audio wave detector) 104a. The concentric circles are for illustration purposes to demonstrate the concept that varying levels of dampening lead to varying effective ranges for the microphones. Without dampening, the audio data may have a low signal-to-noise ratio. Physical filtering may be accomplished with foam dampeners to allow parameters such as frequency and decibel level to be drawn out and analyzed. Dampeners 560 and 562 on the microphones may be used in varying degrees to accomplish the physical filtering needed to obtain meaningful parameters such as frequency and decibel level for comparison in the microcontroller 128. Varying dampening may also provide added level of certainty to the gunshot detection in the microcontroller 128. For example, when the fully dampened 562 microphone 108d meets the audio threshold parameters 216 of the predetermined audio threshold parameters 210, such as frequency range 220 and sound pressure level 224, then there is a very high likelihood that a gunshot has been fired because very few, if any, other events may penetrate the dampening and meet the audio threshold parameters 216.

Effective ranges and useful signals may also be obtainable with a single efficient, expensive, or more complex microphone. For example, depending on the environment in which the audio wave detector 104, 104a, 104b is to be placed, there may be a dedicated configuration for that particular application. For example, an audio wave detector 104, 104a, 104b that is to be placed in an office may have one microphone with less dampening because noises as loud as a gunshot are not expected, whereas another audio wave detector 104, 104a, 104b to be placed in an industrial setting may have multiple microphones with more dampening because in such an environment there may be loud noises expected and multiple microphones with more dampening may minimize false positives.

The sensor device (i.e., audio wave detector) 104, 104a, 104b may be configured, for example, with a detection radius of approximately 30 feet per NFPA guidelines for smoke detectors, which may enable about one detector per typical office sized room.

When the sensor device 104, 104a, 104b includes a plurality of microphones 108b-108d, each may be independently configured to receive the audio waves 112 for input into the ADC 120, and the ADC 120 may create a separate digital signal 124 for audio waves 112 received by each microphone 108b-108d. Further, each microphone 108b-108d may have a dedicated ADC 120, for example, for the three microphones 108b-108d, the sensor device 104a may have three separate ADCs 120 (not shown). The microcontroller 128 may be configured to compare the separate digital signals 124 for the audio waves 112 received by each microphone 108b-108d with the predetermined audio threshold parameters 210 to determine whether the audio waves 112 received by each microphone 108b-108d independently meet the audio threshold parameters 216. The switch 136 may be configured to transmit the trip signal 140 upon the microcontroller 128 determining that the audio waves received 112 by a predetermined number of the plurality of microphones 108b-108d meet the audio threshold parameters 216.

According to an embodiment, the instructions performed by the microcontroller 128 for determining whether received audio waves 112 fall within the range of audio threshold parameters 216 of the predetermined audio threshold parameters 210 corresponding to a gunshot are described in greater detail with reference to the sensor device 104, 104a, 104b of FIGS. 1 through 5. For example, when the sensor device 104, 104a, 104b is turned on it may configure the hardware pins (not shown) of switch 136 and an RF module 304, a network port 308, an Ethernet port 312, a wave guide port 316, or a hard wire port 320 for transmission as well as analog input from the microphones 108b-108d. A sample rate may be pre-set, for example, at 10 KHz, but this may be adjusted depending on the speed of the microcontroller 128 used. For example, the sample rate may be pre-set to greater than 10 KHz, greater than 100 KHz, or even greater than 1000 KHz.

Figure 7:
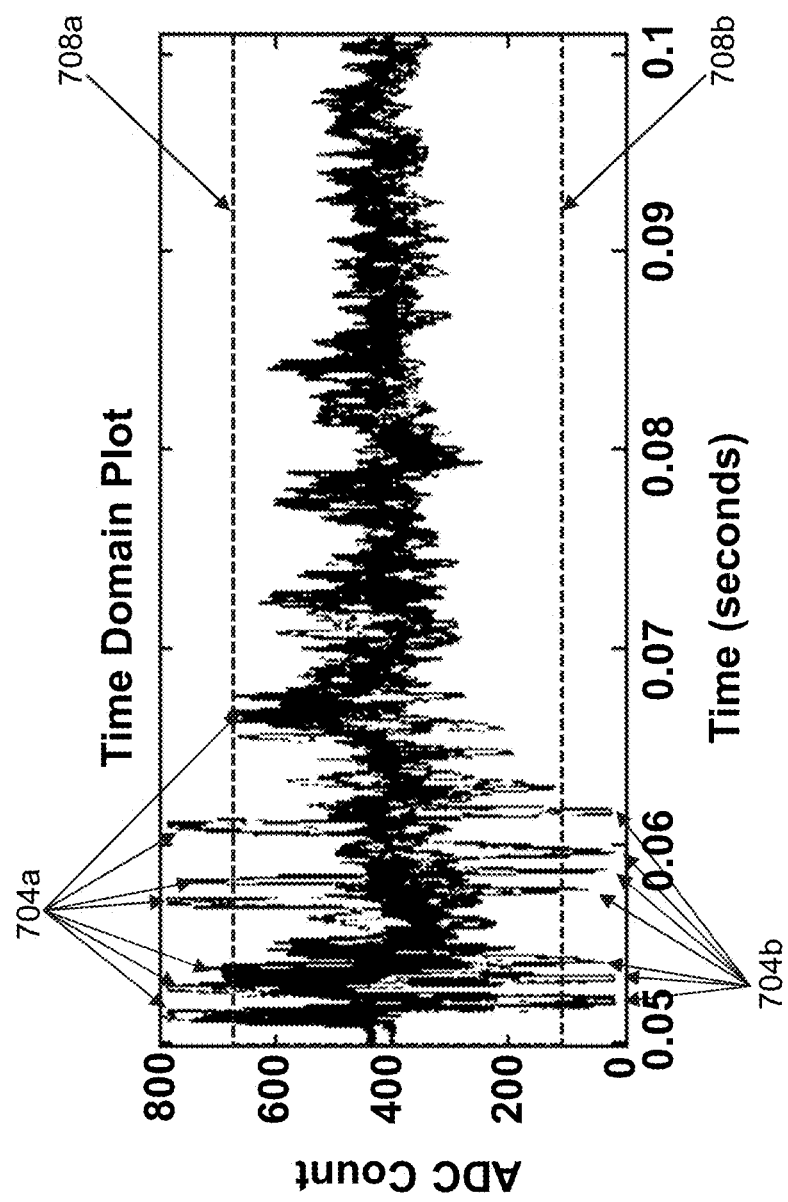
FIG. 7 is a graphical plot of data illustrating minimum and maximum values achieved within a received audio wave sample length in the time domain, and number of times an audio-to-digital converter (ADC) clips above or below a predetermined amplitude window according to an embodiment herein.

FIG. 7, with reference to FIGS. 1 through 6, is a graphical plot of data illustrating the minimum and maximum values achieved within a received audio wave sample length in the time domain, and the number of times 704a, 704b the ADC 120 clips (e.g., registers) above threshold 708a or below threshold 708b in the predetermined amplitude window according to an embodiment herein.

Figure 8:
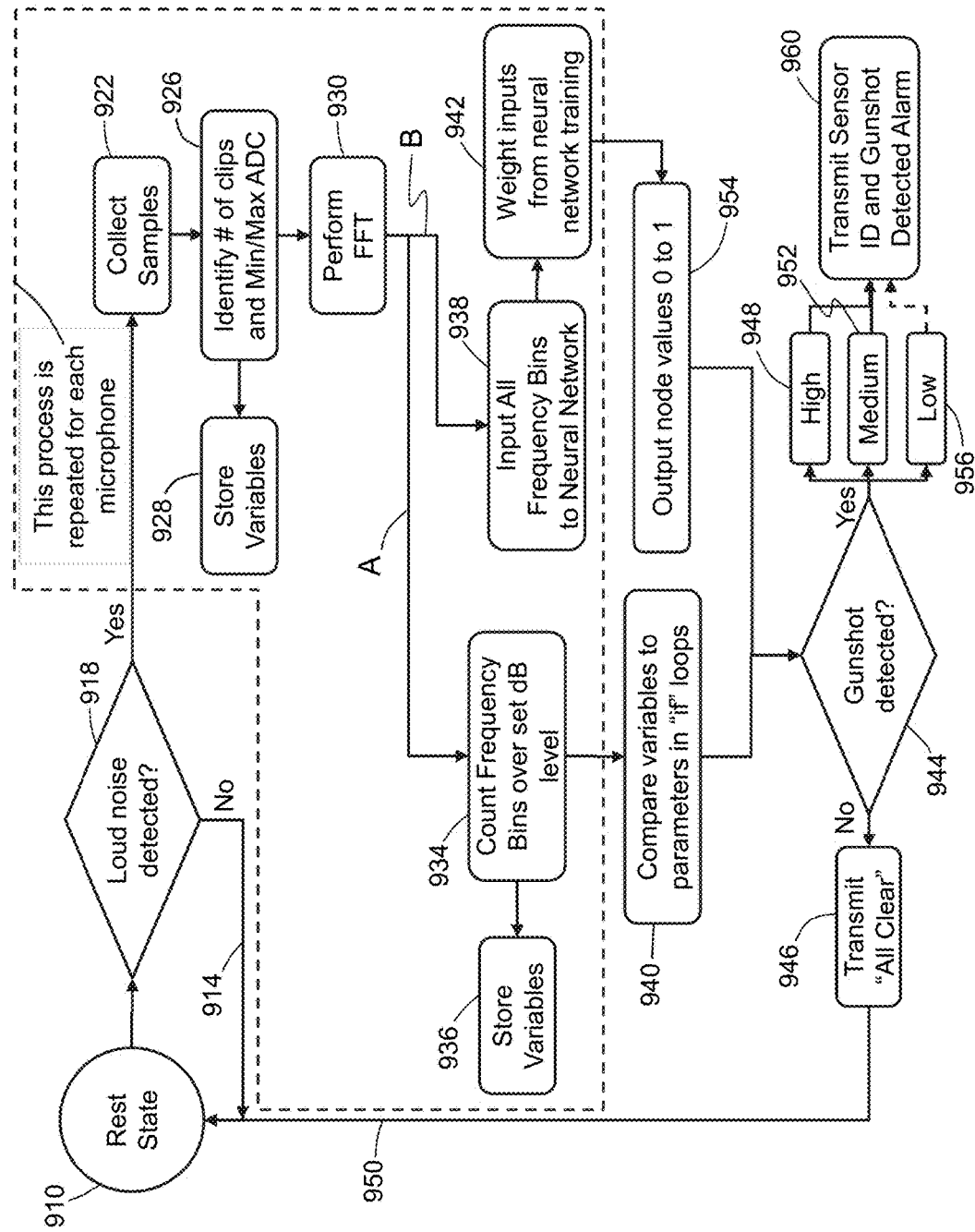
FIG. 8 is a flow diagram of instructions stored on a non-transitory computer-readable memory for determining whether received audio waves fall within the range of audio threshold parameters of a gunshot according to an embodiment herein.

FIG. 8, with reference to FIGS. 1 through 7, illustrates a flow diagram according to an embodiment herein. In a rest state (step 910), the microphones 108b-108d may be continuously sampling the environment but not recording audio files, and the microcontroller 128 may be monitoring the digital signal 124 from the ADC 120 to determine whether a trigger threshold value, such as a loud noise, has been met (step 918). When no trigger value has been met (step 914), the microcontroller 128 may continue monitoring the digital signal 124. Once such a trigger value has been met (at step 918), the microcontroller 128 may isolate the previous ten (for example) samples (step 922), which may be a previous thousandth of a second at 10 KHz from the point the digital signal 124 with the trigger value was received. At a higher sample rate, more previous samples may be collected to capture the same time period. The embodiment described herein is not limited to the previous ten samples, nor a previous thousandth of a second, but these values are used as examples for clarity of description. The microcontroller 128 may collect the following 246 samples of gunshot report or loud noise digital signal 124 to capture a substantial part of the entire audio wave 112. While a total of 256 samples are collected at 10 KHz from before and after the point the digital signal 124 with the trigger value was received, other sample rates and number of samples may be used in accordance with the embodiments herein. For example, the number of samples may be adjusted to coincide with a gunshot report time period to collect a substantial part of the entire audio wave 112.

For each microphone 108b-108d, the microcontroller 128 may analyze the digital signal 124 in both the time domain as well as the frequency domain. In the time domain (step 926), the microcontroller 128 may record the minimum and maximum values (704a, 704b) achieved within the sample length, and record the number of times 704a, 704b the ADC clips (e.g., registers) above threshold 708a (of FIG. 7) or below threshold 708b (of FIG. 7) of the set amplitude window as first output variables (step 928). Both of these variables 704a and 704b may be used in the gunshot decision loop (step 940 below). The first output variables may be the sound pressure level range 244 of the received audio wave 112 that may be compared with predetermined sound pressure level 224.

In an embodiment, a FFT is performed (step 930) for the frequency domain yielding the PSD magnitudes for each microphone 108b-108d. The PSD magnitudes indicate where the average power of the digital signal 124 is distributed as a function of frequency. Through experimental testing, which is not intended to be limiting, it was discovered that a desired frequency range to analyze a potential gunshot signal may be approximately 100-600 Hz, for example the frequency range may be approximately 100-510 Hz, or approximately 200-500 Hz. Based on the sample rate of the processor, the FFT may divide the signal into a certain number of frequency bins so that the signal may be analyzed.

Figure 9:
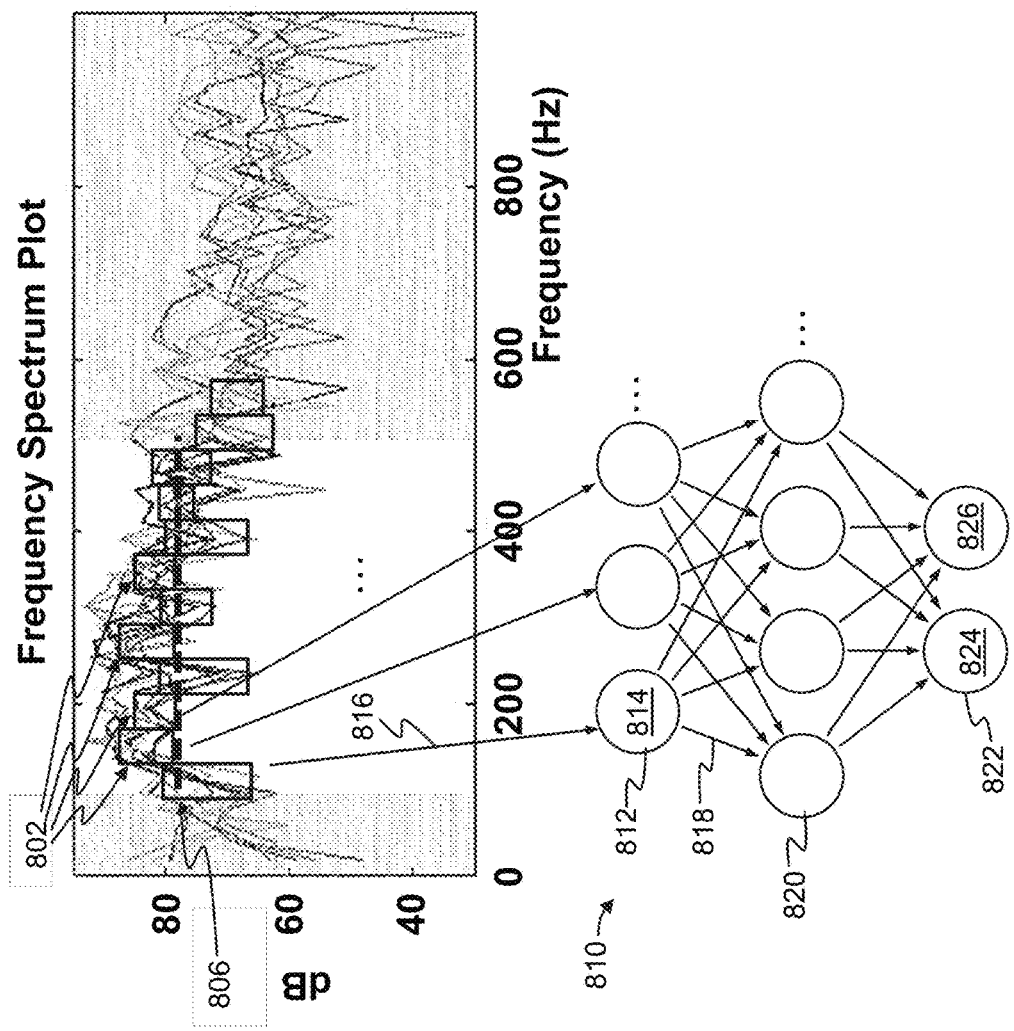
FIG. 9 is a graphical plot of data illustrating FFT (Fast Fourier Transform) of a received audio wave showing the signal divided into frequency bins that exceed a pre-determined decibel (dB) threshold within a predetermined frequency range that may be compared with predetermined ranges of parameters to determine when a gunshot is fired according to an embodiment herein.

FIG. 9, with reference to FIGS. 1 through 8, is a graphical plot of data illustrating FFT of the received audio wave 112 showing the signal divided into frequency bins 802 that exceed a pre-determined dB threshold 806 within a predetermined frequency range (100-500 Hz) that may be compared with predetermined ranges of parameters 220 to determine when a gunshot is fired according to an embodiment herein.

Returning to FIG. 8, in an embodiment of the process indicated by arrow "A" the microcontroller 128 may count (step 934) how many frequency bins 802 exceed a predetermined sound pressure level 806, or dB value, set at 75 dB in FIG. 9, per microphone 108b-108d and store that value (step 936) as a second output variable. While 75 dB was used as the predetermined sound pressure level 806 in the example, the predetermined sound pressure level 806 may be adjusted depending on the room environment and sensor 104a placement. The second output variable may be the frequency parameter (frequency range) 240 of the received audio wave 112. Once the microcontroller 128 completes the process (steps 922-936) for each microphone 108b-108d, the output variables, also referred to above, for example, as received audio wave parameters 236, may be compared (step 940) with the parameter 216 of predetermined audio threshold parameters 210, for example, in "if" loops, to determine whether a gunshot was fired (step 944).

In another embodiment of the process indicated by arrow "B", the FFT signal of the received audio wave from step 930 may be divided into frequency bins within a predetermined frequency range and fed into a neural network as inputs (step 938). An embodiment of the neural network 810 is illustrated in FIG. 9. The neural network 810 may include an input layer 812 of nodes 814 to receive the PSD values of frequency bins 802 illustrated by arrow 816. The number of input nodes 814 may depend on the number of bins 802, the frequency range, the number of microphones 108b-d, and the like. Vector weights 818 as determined from the neural network 810 training, map the input nodes 814 to a hidden layer 820. The hidden layer 820 maps the weighted vectors 818 to an output layer 822. The output layer 822 may have a gunshot node 824 and a non-gunshot node 826. Each output node 824, 826 may yield a value between 0 and 1. A gunshot node 824 value closer to 1 refers to a result of a gunshot more likely than a non-gunshot. A non-gunshot node 826 value closer to 1 refers to a result of a non-gunshot more likely than a gunshot.

The neural network 810 may classify the signal using trained weight vectors 818 (step 942) to determine when a gunshot is fired; e.g., yielding a node value of 0 to 1 (step 954), as given in FIG. 8. That is, the trained neural network 810 uses all frequency bins within the predetermined frequency range to determine when a gunshot has been fired. Once the microcontroller 128 completes the process (steps 922-930 and 938-942) for each microphone 108b-108d, the neural network 810 provides a neural network classification result (step 954). Based on the neural network classification result (step 954), whether a gunshot was fired may be determined (step 944).

When the output variables do not meet minimum thresholds then the sensor device 104a may transmit an all clear signal (step 946) and reset (step 950), and return to rest state (step 910). When the output variables 236 fall within the predetermined parameter ranges 216, for example, in the "if" loops or in the neural network (step 944) then the microcontroller 128 may output either a high probability of a gunshot report (step 948), a medium probability of a gunshot report (step 952), or a low probability of a gunshot report (step 956). The varying degrees of certainty may be used to tailor responses and provide additional information to the location of the gunshot. When a gunshot report is detected the microcontroller 128 may activate the switch 136 and transmit the trip signal 140 including sensor device 104a location and positive identification of a gunshot report (step 960).

Figure 10A:
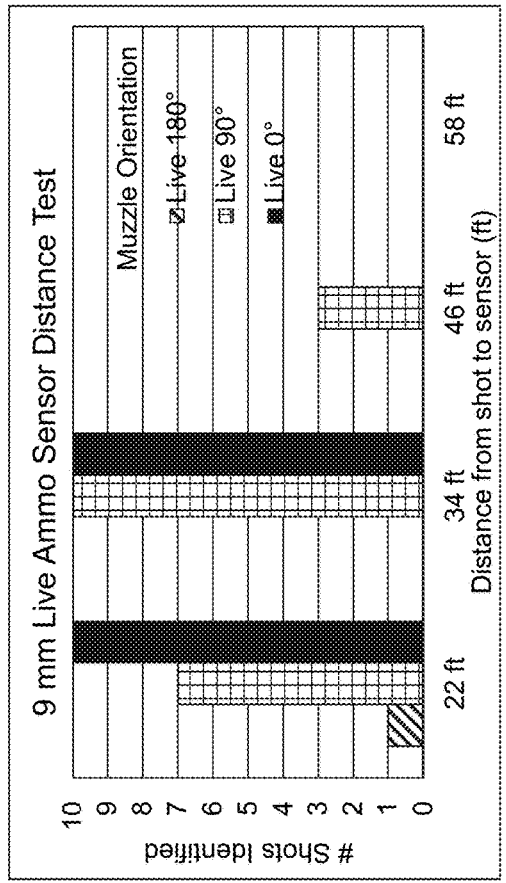
FIG. 10A illustrates experimental testing results data for live rounds detected by a gunshot detection system according to an embodiment herein.
Figure 10B:
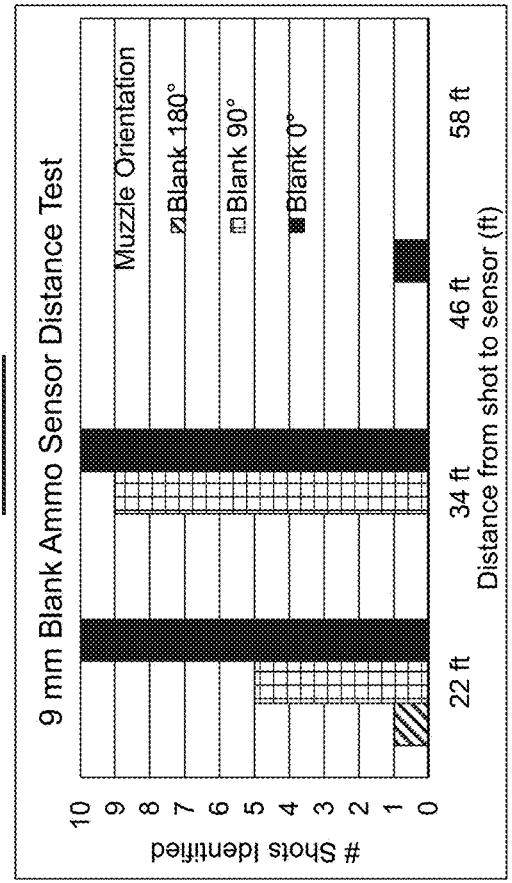
FIG. 10B illustrates experimental testing results data for blank rounds detected by a gunshot detection system according to an embodiment herein.

Experimental testing results are provided in Tables 1 and 2 and plots are shown in FIGS. 10A and 10B. Table 1 presents results of a first test using live rounds of 9 mm ammunition fired into a bullet trap 5 ft. from the live shooter. Sensors were mounted to the ceiling at 22 ft., 34 ft., 46 ft., and 58 ft. increments from the live shooter marked along the floor. The experimental ceiling was 9 ft. high. The shots were fired toward the sensors at 0° muzzle orientation, perpendicular to the direction to the sensors at 90° muzzle orientation, and away from the sensors at 180° muzzle orientation. After a shot had been fired each of the four sensors was evaluated to determine which had identified a gunshot and which sensors had not. The process was repeated 10 times for each muzzle orientation (180°, 90°, and 0°). The entire test was repeated using 9 mm blanks (Table 2). An additional shot for a flip test along an opposite wall of the room was performed for the 9 mm blank and is included in Table 2.

For each shot fired, four data points were collected. The data collected was either a yes (1) or a no (0) indication from each individual sensor and is presented in the Tables below. The data was compiled into two bar graphs following the tests which are presented in FIGS. 10A and 10B for the number of positive identifications at the various ranges and shot orientations, for live rounds and blank rounds, respectively.

TABLE 1

Distance - Live 9 mm
Orientation

| Trial | 0° 22 ft. | 0° 34 ft. | 0° 46 ft. | 0° 58 ft. | 90° 22 ft. | 90° 34 ft. | 90° 46 ft. | 90° 58 ft. | 180° 22 ft. | 180° 34 ft. | 180° 46 ft. | 180° 58 ft. |
|---|---|---|---|---|---|---|---|---|---|---|---|---|
| 1 | 1 | 1 | 0 | 0 | 1 | 1 | 1 | 0 | 0 | 0 | 0 | 0 |
| 2 | 1 | 1 | 0 | 0 | 1 | 1 | 0 | 0 | 0 | 0 | 0 | 0 |
| 3 | 1 | 1 | 0 | 0 | 1 | 1 | 1 | 0 | 1 | 0 | 0 | 0 |
| 4 | 1 | 1 | 0 | 0 | 1 | 1 | 0 | 0 | 0 | 0 | 0 | 0 |
| 5 | 1 | 1 | 0 | 0 | 0 | 1 | 0 | 0 | 0 | 0 | 0 | 0 |
| 6 | 1 | 1 | 0 | 0 | 0 | 1 | 0 | 0 | 0 | 0 | 0 | 0 |
| 7 | 1 | 1 | 0 | 0 | 1 | 1 | 0 | 0 | 0 | 0 | 0 | 0 |
| 8 | 1 | 1 | 0 | 0 | 1 | 1 | 1 | 0 | 0 | 0 | 0 | 0 |
| 9 | 1 | 1 | 0 | 0 | 1 | 1 | 0 | 0 | 0 | 0 | 0 | 0 |
| 10 | 1 | 1 | 0 | 0 | 0 | 1 | 0 | 0 | 0 | 0 | 0 | 0 |
| Total | 10 | 10 | 0 | 0 | 7 | 10 | 3 | 0 | 1 | 0 | 0 | 0 |

1 = detect
0 = no detect
X = no processing
>90% effective (feet):
  0° 34
  90° 34
  180° 0

TABLE 2

Distance - Blank 9 mm
Orientation

| Trial | 0° 22 ft. | 0° 34 ft. | 0° 46 ft. | 0° 58 ft. | 90° 22 ft. | 90° 34 ft. | 90° 46 ft. | 90° 58 ft. | 180° 22 ft. | 180° 34 ft. | 180° 46 ft. | 180° 58 ft. |
|---|---|---|---|---|---|---|---|---|---|---|---|---|
| 1 | 1 | 1 | 0 | 0 | 1 | 1 | 0 | 0 | 0 | 0 | 0 | 0 |
| 2 | 1 | 1 | 0 | 0 | 0 | 1 | 0 | 0 | 0 | 0 | 0 | 0 |
| 3 | 1 | 1 | 0 | 0 | 1 | 1 | 0 | 0 | 0 | 0 | 0 | 0 |
| 4 | 1 | 1 | 0 | 0 | 1 | 1 | 0 | 0 | 0 | 0 | 0 | 0 |
| 5 | 1 | 1 | 0 | 0 | 0 | 0 | 0 | 0 | 0 | 0 | 0 | X |
| 6 | 1 | 1 | 0 | 0 | 0 | 1 | 0 | 0 | 0 | 0 | 0 | 0 |
| 7 | 1 | 1 | 0 | 0 | 0 | 1 | 0 | 0 | 0 | 0 | 0 | 0 |
| 8 | 1 | 1 | 0 | 0 | 0 | 1 | 0 | 0 | 1 | 0 | 0 | 0 |

TABLE 2-continued

Distance - Blank 9 mm Orientation

| Trial | 0° 22 ft. | 0° 34 ft. | 0° 46 ft. | 0° 58 ft. | 90° 22 ft. | 90° 34 ft. | 90° 46 ft. | 90° 58 ft. | 180° 22 ft. | 180° 34 ft. | 180° 46 ft. | 180° 58 ft. |
|---|---|---|---|---|---|---|---|---|---|---|---|---|
| 9 | 1 | 1 | 0 | 0 | 1 | 1 | 0 | 0 | 0 | 0 | 0 | 0 |
| 10 | 1 | 1 | 0 | 0 | 1 | 1 | 0 | 0 | 0 | 0 | 0 | 0 |
| Total (plus flip) | 11 | 11 | 1 | 0 | 5 | 9 | 0 | 0 | 1 | 0 | 0 | 0 |

1 = detect
0 = no detect
X = no processing
>90% effective (feet):
 0° 34
 90° 34
 180° 0

Table 3 presents the results for false positive tests. The false positive rate on the sensor was determined in the false positive tests. Outdoor noises such as large fireworks or backfiring engines were not be tested. The test was designed for worst case scenarios such as a loud noise that is not gunfire located underneath the sensor (5 ft. distance). The test was conducted in the same conference room as the live and blank 9 mm gunshot tests presented in Tables 1 and 2. Three of the sensors were removed and no shots were fired in the false positive tests.

Eight categories of noises were generated to attempt to trigger the sensors. Each category had ten trials. Once the noise was generated, the sensor was evaluated to determine whether the noise had triggered it. The data was recorded and the next trial commenced. The categories were: a balloon burst, a hammer against a piece of wood, a hammer against a piece of metal, a door slam, a large book slammed down on a table, a rock slammed into a metal trash can, a cabinet knocked over onto the floor, and a wood plank clapped against sidewall of filing cabinet while opposite sidewall of cabinet lying on floor. The data collected was a yes (1) or no (0) indication from the sensor after the noise had been generated. When the sensor activated, it was recorded as a false positive.

TABLE 3

False Positive Noise

| Trial | Balloon | Hammer - Wood | Hammer - Metal | Door Slam | Book Slam | Rock Slam | Bookshelf/ Filing Cabinet | Wood Plank |
|---|---|---|---|---|---|---|---|---|
| 1 | 0 | X | X | X | 0 | X | 0 | 0 |
| 2 | X | 0 | X | X | 0 | 0 | X | 1 |
| 3 | 0 | 0 | X | 0 | 0 | 0 | 0 | 1 |
| 4 | X | X | 0 | 0 | X | X | X | 0 |
| 5 | 0 | 0 | 0 | 0 | X | 0 | X | 0 |
| 6 | 0 | 0 | 0 | 0 | X | 0 | X | 0 |
| 7 | 0 | 0 | 0 | 0 | X | X | X | 0 |
| 8 | 0 | 0 | 0 | X | X | X | X | 0 |
| 9 | 0 | 0 | 0 | 0 | X | X | X | X |
| 10 | X | 0 | 0 | X | X | X | X | X |
| Total Above 10% false positive rate | 0 | 0 | 0 | 0 | 0 | 0 | 0 | 2 Wood plank |

1 = detect
0 = no detect
X = no processing
*Wood plank False positive rate: 0.025
*3 x 1 wood plank clapped against sidewall of filing cabinet while opposite sidewall of cabinet lying on floor A method 1000 of detecting a gunshot according to an exemplary embodiment is shown in the flow diagram of FIG. 11, with reference to FIGS. 1 through 10B. The method 1000 may include detecting, via at least one microphone 108*a*-108*d*, an audio wave 112 as an analog input in step 1004. The method 1000 may include converting, via at least one ADC 120 operatively connected to the at least one microphone 108*b*-108*d*, the analog input into a digital signal 124 in step 1008. The method 1000 may include comparing, via a microcontroller 128 operatively connected to the at least one ADC 120 and programmed with audio threshold parameters 216 related to each of a frequency range 220 and a sound pressure level 224 associated with the predetermined audio threshold parameters 210, the digital signal 124 with the predetermined audio threshold parameters 210 in step 1012. The method 1000 may include determining, via the microcontroller 128, when the detected audio wave 112 meets the audio threshold parameters 216 in step 1016, and transmitting in step 1020, via a switch 136 operatively connected to the microcontroller 128, a trip signal 140 to a predetermined emergency management and response system 144 upon the microcontroller 128 determining that the detected audio wave 112 meets the audio threshold parameters 216.

In another embodiment, the method 1000 may use a neural network 810 for determining whether received audio waves fall within the range of audio threshold parameters of a gunshot. For example, the step 1012 may include (a) entering the PSD data from the FFT to the input layer of the neural network 810 for the neural network 810 to perform a classification, and (b) the neural network 810 performing classification of the input. Then in step 1016, the method 1000 may determine whether the neural network 810 classifies the detected audio as a gunshot. When the neural network 810 classifies the detected audio as a gunshot a trip signal 140 may be transmitted in step 1020, via a switch 136 operatively connected to the microcontroller 128, to the predetermined emergency management and response system 144.

The neural network 810 may be trained to classify gunshots as described above. Further, in an exemplary embodiment, the neural network 810 may have about 93 inputs, which may include 31 frequency bins from each of three microphones. For example, the neural network 810 may have about 64 inputs, which may include 32 frequency bins from each of two microphones, or similar number of inputs. The frequency bins may be sequential from a bin centered at the low frequency end of the spectrum, for example, at 100 Hz or 205 Hz, or at a frequency between 100 Hz and 205 Hz, to a bin centered at the high frequency end of the spectrum, such as 500 Hz, 507 Hz, 600 Hz, or at a frequency between 500 Hz and 600 Hz. For example, the frequency bins may be sequential increments of frequency ranges where the first bin may be 100-112.5 Hz, the second bin may be 112.5-125 Hz, the third bin may be 125-137.5 Hz, etc. to the end of the frequency range, such as a $32^{nd}$ bin of 487.5-500 Hz. The maximum PSD value within each frequency bin may be recorded and either counted when above 75 dB or input to the neural network in the embodiment utilizing a neural network. The 12.5 Hz bin size described in the example is notional, and may be smaller or larger depending on factors such as the total frequency range, sample rate of the processor and set predetermined bin size. The neural network 810 may contain 15 hidden layers and two output layers. The output layers may provide the classification of the input signal. For example, Node 0 may provide how much the input signal resembles the gunshots, and Node 1 may provide how much the signal resembles the false alarms. For example, the neural network 810 may have at least one input layer of at least sixty-two input nodes, at least one hidden layer of at least fifteen nodes, and at least one output layer of at least two output nodes.

When the microcontroller 128 determines the detected audio wave 112 does not meet the audio threshold parameters 216 in step 1016, feedback step 1018 may return the method 1000 to detecting an audio wave 112 as an analog input in step 1004. The method 1000 may also include step 1026 for returning the method 1000 to detecting an audio wave 112 as an analog input in step 1004 after the transmitting in step 1020.

In an embodiment, transmitting the trip signal 140 in step 1020 may include any of wirelessly transmitting, transmitting over a network—such as via an Ethernet connection—transmitting over a wave guide or optical fiber, and transmitting over a wire. The predetermined emergency management and response system 144 may include any of a fire protection system and a security system. The step 1004 may include dampening the detecting, for example with a dampener 110, 560, and 562 surrounding the at least one microphone 108a-108d.

Furthermore, in step 1004, the detecting may include detecting the audio wave 112 as a plurality of analog inputs via the plurality of microphones 108a-108d. In the converting, step 1008, each analog input from the microphones 108a-108d may be independently converted into a separate digital signal. In the comparing step 1012, each separate digital signal may be compared with the predetermined audio wave. In the determining, step 1016, each of the plurality of analog inputs may be independently determined to meet the audio threshold parameters 216.

The dampening may include dampening the plurality of microphones 108a-108d at different levels from each other. The transmitting step 1020 may include transmitting the trip signal 140 upon determining, via the microcontroller 128, that the audio wave 112 detected by the plurality of microphones 108a-108d meets the audio threshold parameters 216. Indeed, the predetermined audio threshold parameters 210 may be associated with an audio wave generated by a gunshot. Thus, when the audio wave 112 detected by the plurality of microphones 108a-108d meets the audio threshold parameters 216 the audio wave 112 may be considered generated by a gunshot.

In an exemplary embodiment, the various steps in the flow diagrams described herein may be configured as computer-instructions stored in computer-readable memory 132 and processed by modules, which are embodied as hardware-enabled modules and may be configured as a plurality of overlapping or independent electronic circuits, devices, and discrete elements packaged onto a circuit board to provide data and signal processing functionality within a computer. An example might be a comparator, inverter, or flip-flop, which could include a plurality of transistors and other supporting devices and circuit elements. The modules that are configured with electronic circuits that process computer logic instructions capable of providing digital and/or analog signals for performing various functions as described herein. The various functions may further be embodied and physically saved as any of data structures, data paths, data objects, data object models, object files, and database components. For example, the data objects could be configured as a digital packet of structured data. The data structures could be configured as any of an array, tuple, map, union, variant, set, graph, tree, node, and an object, which may be stored and retrieved by computer memory and may be managed by processors, compilers, and other computer hardware components. The data paths may be configured as part of a computer CPU that performs operations and calculations as instructed by the computer logic instructions. The data paths could include digital electronic circuits, multipliers, registers, and buses capable of performing data processing operations and arithmetic operations (e.g., Add, Subtract, etc.), bitwise logical operations (AND, OR, XOR, etc.), bit shift operations (e.g., arithmetic, logical, rotate, etc.), complex operations (e.g., using single clock calculations, sequential calculations, iterative calculations, etc.). The data objects may be configured as physical locations in computer memory and may be a variable, a data structure, or a function. In the embodiments configured as relational databases (e.g., such Oracle® relational databases), the data objects may be configured as a table or column. Other configurations include specialized objects, distributed objects, object oriented programming objects, and semantic web objects, for example. The data object models may be configured as an application programming interface for creating HyperText Markup Language (HTML) and Extensible Markup Language (XML) electronic documents. The models may be further configured as any of a tree, graph, container, list, map, queue, set, stack, and variations thereof. The data object files are created by compilers and assemblers and contain generated binary code and data for a source file. The database components may include any of tables, indexes, views, stored procedures, and triggers.

The embodiments herein may comprise a computer program product configured to include a pre-configured set of instructions, which when performed, may result in actions as stated in conjunction with the methods described above. In an example, the pre-configured set of instructions may be stored on a tangible, non-transitory computer readable medium or a program storage device. In an example, the tangible non-transitory computer readable medium may be configured to include the set of instructions, which when performed by a device, may cause the device to perform acts similar to the ones described here. Embodiments herein may also include tangible and/or non-transitory computer-readable storage media for carrying or having computer executable instructions or data structures stored thereon.

Generally, program modules include routines, programs, components, data structures, objects, and the functions inherent in the design of special-purpose processors, etc. that perform particular tasks or implement particular abstract data types. Computer executable instructions, associated data structures, and program modules represent examples of the program code means for executing steps of the methods disclosed herein. The particular sequence of such executable instructions or associated data structures represents examples of corresponding acts for implementing the functions described in such steps. The embodiments herein may include both hardware and software elements. The embodiments that are implemented in software include but are not limited to, firmware, resident software, microcode, etc.

A schematic of a combination gunshot and environment detection system 1200 and an emergency management and response system 144a is illustrated in FIG. 12A, with reference to FIGS. 1 through 11. According to the illustrated embodiment in FIG. 12A, the detection system 1200 may operate automatically, that is, for example, without manual operator monitoring, interpretation, input, decision making, or judgment. As illustrated in FIG. 12A, the combination gunshot and environment detection system 1200 may include a multi-sensor device 1202. The multi-sensor device 1202 may include an audio wave detector 104c and an environment detector 1204. The audio wave detector 104c and the environment detector 1204 may be disposed in a shared housing 1210 and share a switch 136a. By using a commonly shared switch 136a, the number of components may be reduced, thereby reducing cost and saving space in the shared housing 1210.

In addition to the switch 136a, the audio wave detector 104c may include an audio sensor, such as a microphone 108e, configured to receive audio waves 112, such as from a gunshot. Details of such a microphone 108e or plurality of microphones are described above, for example, with reference to the microphones 108b-108d in FIG. 5. The audio wave detector 104c may include a processor 116 to compare the received audio wave 112 to stored predetermined audio threshold parameters 210 as described above. Upon determining that the audio waves 112 comprise audio waves of a gunshot report, the processor 116 may send a control signal 1212 to control the switch 136a operatively connected to the processor 116 to transmit a gunshot trip signal 140a to the emergency management and response system 144a.

In addition to the switch 136a, the environment detector 1204 may include an environment sensor 1214 or a plurality of environment sensors, such as a smoke sensor, a heat sensor, a $CO_2$ sensor, a CO sensor, a chemical sensor, a radioactivity sensor, a low oxygen sensor ($O_2$ sensor), a severe weather alert sensor, and the like, configured to receive an environment indicator 1218, such as smoke from a fire, heat from a fire, $CO_2$, CO, tornado warning, and the like. For example, the smoke detector may be an ionization smoke detector, photoelectric smoke detector, or a combination thereof. The environment detector 1204 may include an environment processor 116a to determine whether the received environment indicator 1218 matches a predetermined threshold. Upon determining that the received environment indicator 1218 matches the predetermined threshold, the environment processor 116a may send a control signal 1220 to control the switch 136a operatively connected to the environment processor 116a to transmit an environment trip signal 140b to the emergency management and response system 144a. Matching the received environment indicator 1218 to the predetermined threshold may include the received environment indicator 1218 exceeding the predetermined threshold or falling within a range of the predetermined threshold. Further, the control signal 1220 sent from the environment processor 116a may control the switch 136a to transmit an environment trip signal 140b to the emergency management and response system 144a, comprising information about the type of environment indicator 1218 received such as smoke, heat, elevated $CO_2$, CO, chemical vapors, excessive radiation, low oxygen, severe weather approaching, and the like.

The emergency management and response system 144a may be configured to distinguish the gunshot trip signal 140a from the environment trip signal 140b. The emergency management and response system 144a may then provide a predetermined alarm and alert course of action based on the distinguished trip signal 140a, 140b received.

FIG. 12B, with reference to FIGS. 1 through 12A, depicts a schematic of another embodiment of a combination gunshot and environment detection system 1200a and an emergency management and response system 144a. As illustrated in FIG. 12B, the combination gunshot and environment detection system 1200a may include a multi-sensor device 1202a. The multi-sensor device 1202a may include an audio wave detector 104d and an environment detector 1204a. The audio wave detector 104d and the environment detector 1204a may be disposed in a shared housing 1210a and share a processor 116b and a switch 136b. By using a commonly shared processor 116b and a commonly shared switch 136b, the number of components may be reduced, thereby reducing cost and saving space in the shared housing 1210a.

In addition to the processor 116b and the switch 136b, the audio wave detector 104d may include the audio sensor, such as microphone 108e, configured to receive audio waves 112, such as from a gunshot, and transmit an audio wave signal 1222 to the processor 116b.

The shared processor 116b of the audio wave detector 104d and environment detector 1204a may compare the received audio wave 112 to stored predetermined audio threshold parameters 210 as described above. Upon determining that the audio waves 112 comprise audio waves of a gunshot report, the shared processor 116b may control the switch 136b operatively connected to the processor 116b to transmit a gunshot trip signal 140c to the emergency management and response system 144a.

In addition to the processor 116b and the switch 136b, the environment detector 1204a may include the environment sensor 1214 or a plurality of environment sensors, such as described above, configured to receive an environment indicator 1218 and transmit an environment signal 1224 to the shared processor 116b of the environment detector 1204a and the gunshot detector 104d. The shared processor 116b may determine whether the received environment indicator 1218 matches a predetermined threshold. Upon determining that the received environment indicator 1218 matches the predetermined threshold, the shared processor 116b may control the switch 136b operatively connected to the shared processor 116b to transmit an environment trip signal 140d to the emergency management and response system 144a. As described above, the shared processor 116b may control the switch 136b to transmit an environment trip signal 140d to the emergency management and response system 144a, comprising information identifying the type of environment indicator 1218 received.

The emergency management and response system 144a may be configured to distinguish the gunshot trip signal 140c from the environment trip signal 140d. The emergency management and response system 144a may then provide a predetermined alarm and alert course of action based on the distinguished trip signal 140c, 140d received.

Figure 12C:
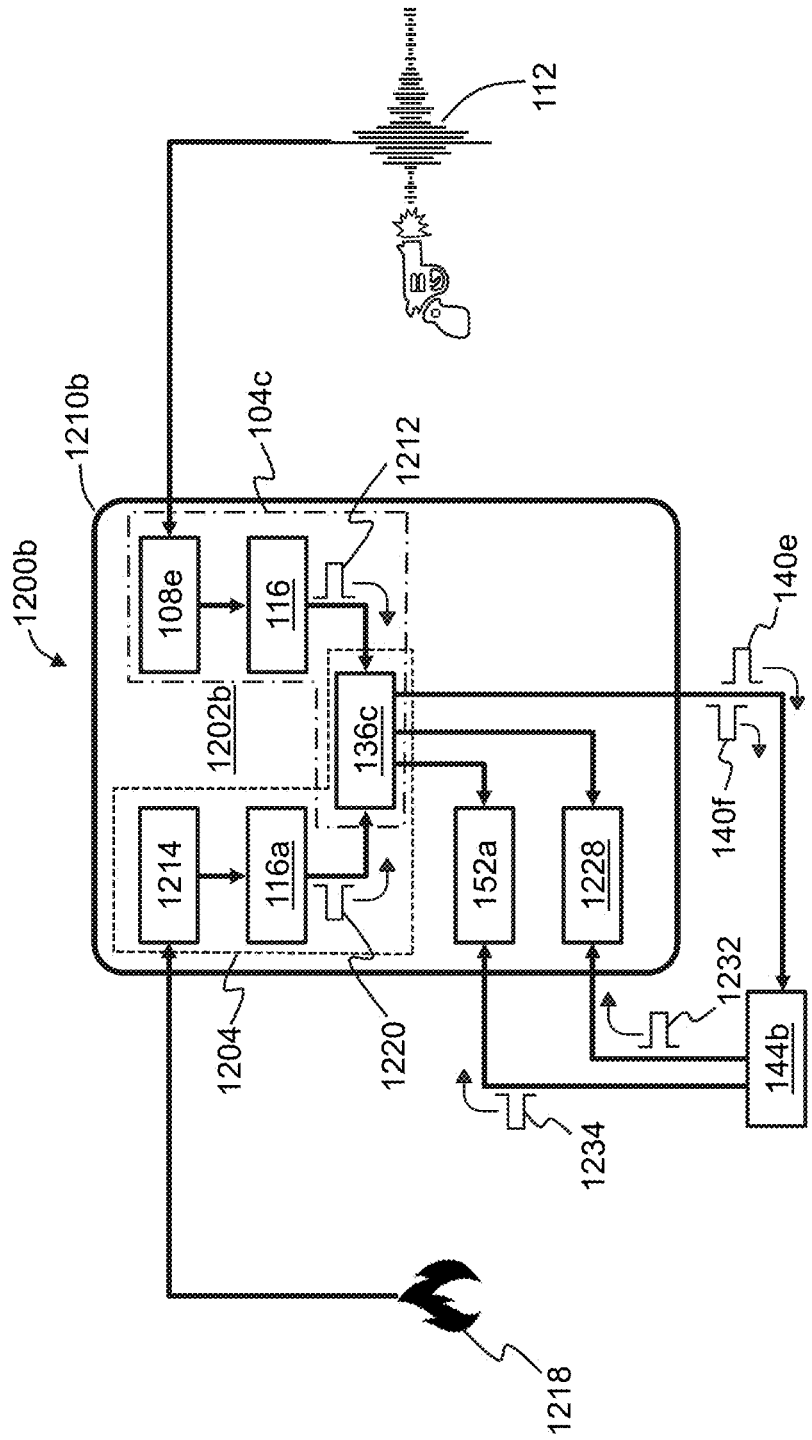
FIG. 12C is a schematic of a combination gunshot and environment detection system and an emergency management and response system according to still another embodiment herein.

A schematic of another embodiment of a combination gunshot and environment detection system 1200b and an emergency management and response system 144*b* is depicted in FIG. 12C, with reference to FIGS. 1 through 12B. As described with respect to FIG. 12A, the multi-sensor device 1202*b* may include an audio wave detector 104*c* and an environment detector 1204 that fit in a common housing 1210*b* and utilize a common switch 136*c*. In addition to the switch 136*c*, the audio wave detector 104*c* may include an audio sensor, such as a microphone 108*e*, configured to receive audio waves 112, such as from a gunshot. Details of such a microphone 108*e* or plurality of microphones are described above, for example, with reference to the microphones 108*b*-108*d* in FIG. 5. The audio wave detector 104*c* may include a processor 116 to compare the received audio wave 112 to stored predetermined audio threshold parameters 210 as described above. Upon determining that the audio waves 112 comprise audio waves of a gunshot report, the processor 116 may send a control signal 1212 to control the switch 136*c* operatively connected to the processor 116 to transmit a gunshot trip signal 140*e* to the emergency management and response system 144*b*.

In addition to the switch 136*c*, the environment detector 1204 may include an environment sensor 1214 or a plurality of environment sensors configured to receive an environment indicator 1218, such as described above. The environment detector 1204 may include an environment processor 116*a* to determine whether the received environment indicator 1218 matches a predetermined threshold. Upon determining that the received environment indicator 1218 matches the predetermined threshold, the environment processor 116*a* may send a control signal 1220 to control the switch 136*c* operatively connected to the environment processor 116*a* to transmit an environment trip signal 140*f* to the emergency management and response system 144*b*. Matching the received environment indicator 1218 to the predetermined threshold may include the received environment indicator 1218 exceeding the predetermined threshold or falling within a range of the predetermined threshold. Further, the control signal 1220 sent from the environment processor 116*a* may control the switch 136*c* to transmit an environment trip signal 140*f* to the emergency management and response system 144*b*, comprising information about the type of environment indicator 1218 received such as smoke, heat, elevated $CO_2$, CO, chemical vapors, excessive radiation, low oxygen, severe weather approaching, and the like.

In the illustrated embodiment of FIG. 12C, the multi-sensor device 1202*b* may further include an environment alarm 152*a* and a gunshot alarm 1228. When the switch 136*c* transmits the gunshot trip signal 140*e* to the emergency management and response system 144*b* the switch may also send a signal to the gunshot alarm 1228 to activate the gunshot alarm 1228. The switch 136*c* may transmit the gunshot trip signal 140*e* to the emergency management and response system 144*b* and send the signal to the gunshot alarm 1228 simultaneously or nearly simultaneously.

When the switch 136*c* transmits the environment trip signal 140*f* to the emergency management and response system 144*b* the switch may also send a signal to the environment alarm 152*a* to activate the environment alarm 152*a*. The switch 136*c* may transmit the environment trip signal 140*f* to the emergency management and response system 144*b* and send the signal to the environment alarm 152*a* simultaneously or nearly simultaneously.

Furthermore, when the emergency management and response system 144*b* receives the gunshot trip signal 140*e*, the emergency management and response system 144*b* may send a gunshot alarm signal 1232 to any multi-sensor device 1202*b*, alarm 152, or other gunshot sensor device 104, 104*a*, 104*b* having an alarm 1228, in the building to broadcast an active shooter alert. Thus, the emergency management and response system 144*b* may immediately notify authorities 168 (FIG. 4) of a triggered detector's (e.g., audio wave detectors 104, 104*a*, 104*b*) location, and immediately alert building occupants via the active shooter visual and/or auditory alarm, when detecting a gunshot. When the emergency management and response system 144*b* receives the environment trip signal 140*f*, the emergency management and response system 144*b* may send an environment alarm signal 1234 to any multi-sensor device 1200, 1200*a*, 1202*b*, alarm 152, or other gunshot sensor device 104, 104*a*, 104*b* having an alarm 152*a*, in the building to broadcast an environment alert. Thus, the emergency management and response system 144*b* may immediately notify authorities 168 (FIG. 4) of a triggered detector's (e.g., audio wave detectors 104, 104*a*, 104*b*) location, and immediately alert building occupants via the environment visual and/or auditory alarm, when detecting an environment indicator.

The foregoing description of the specific embodiments will so fully reveal the general nature of the embodiments herein that others may, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Those skilled in the art will recognize that the embodiments herein may be practiced with modification within the spirit and scope of the appended claims.

What is claimed is:

1. A sensor device comprising:
    at least one microphone configured to receive audio waves with a dampener surrounding said at least one microphone;
    at least one analog-to-digital converter (ADC) operatively connected to said at least one microphone and configured to convert said audio waves into a digital signal;
    a microcontroller operatively connected to said at least one ADC and comprising a non-transitory computer-readable memory having instructions stored thereon, said instructions comprising audio threshold parameters related to each of a frequency range and a sound pressure level associated with a predetermined audio wave, wherein said microcontroller compares said digital signal of said audio waves with said predetermined audio wave to determine whether said audio waves meet said audio threshold parameters; and
    a switch operatively connected to said microcontroller and configured to transmit a trip signal to a predetermined emergency management and response system upon said microcontroller determining that said audio waves meet said audio threshold parameters, wherein said at least one microphone comprises a plurality of microphones, and wherein said dampener comprises a plurality of dampeners that are configured to dampen said plurality of microphones at different levels from each other.

2. The sensor device of claim 1, further comprising any of a radio frequency (RF) module, a network port, an Ethernet port, a wave guide port, and a hard wire port operatively connected to said switch, wherein said RF module is configured to wirelessly transmit said trip signal.

3. The sensor device of claim 1, wherein said predetermined emergency management and response system comprises any of a fire protection system and a security system.

4. The sensor device of claim 1, wherein said at least one microphone comprises a plurality of microphones each independently configured to receive said audio waves for input into said at least one ADC, and wherein said at least one ADC creates a separate digital signal for audio waves received by each microphone.

5. The sensor device of claim 4, wherein said microcontroller is configured to compare said separate digital signal for said audio waves received by each microphone with said predetermined audio wave to determine whether said audio waves received by each microphone independently meet said audio threshold parameters.

6. The sensor device of claim 5, wherein said switch is configured to transmit said trip signal upon said microcontroller determining that said audio waves received by a predetermined number of said plurality of microphones meet said audio threshold parameters.

7. The sensor device of claim 1, wherein said predetermined audio wave is associated with an audio wave generated by a gunshot.

8. A method of detecting a gunshot, the method comprising:
   detecting, via a plurality of microphones, an audio wave as an analog input;
   dampening the said audio wave via a dampener surrounding said at least one microphone of the plurality of microphones;
   dampening said plurality of microphones at different levels from each other;
   converting, via at least one analog-to-digital converter (ADC) operatively connected to said at least one microphone, the analog input into a digital signal;
   comparing, via a microcontroller operatively connected to said at least one ADC and programmed with audio threshold parameters related to each of a frequency range and a sound pressure level associated with a predetermined audio wave, said digital signal with said predetermined audio wave;
   determining, via said microcontroller, whether the detected audio wave meets said audio threshold parameters; and
   transmitting, via a switch operatively connected to said microcontroller, a trip signal to a predetermined emergency management and response system upon said microcontroller determining that said detected audio wave meets said audio threshold parameters.

9. The method of claim 8, wherein said comparing comprises inputting said digital signal to a neural network.

10. The method of claim 9, wherein said neural network comprises at least one input layer of at least sixty-two input nodes, at least one hidden layer of at least fifteen nodes, and at least one output layer of at least two output nodes.

11. The method of claim 10, wherein said neural network comprises a trained neural network comprising learned gunshots and learned false alarms received by said at least one microphone to provide classification between detected gunshots and detected false alarms.

12. The method of claim 8, wherein the transmitting said trip signal comprises, any of wirelessly transmitting, transmitting over an Ethernet, transmitting over a wave guide, and transmitting over a wire.

13. The method of claim 8, wherein said predetermined emergency management and response system comprises any of a fire protection system and a security system.

14. The method of claim 8, wherein said at least one microphone comprises a plurality of microphones, wherein said detecting comprises detecting said audio wave as a plurality of analog inputs via said plurality of microphones,
   wherein said converting comprises converting each analog input into a separate digital signal,
   wherein said comparing comprises comparing each separate digital signal with said predetermined audio wave, and
   wherein said determining comprises determining whether each of said plurality of analog inputs independently meets said audio threshold parameters.

15. The method of claim 8, wherein said predetermined audio wave is associated with an audio wave generated by a gunshot.

* * * * *